(12) United States Patent
Roberts

(10) Patent No.: US 9,468,869 B2
(45) Date of Patent: *Oct. 18, 2016

(54) METHOD FOR WASHING A FILTER FOR FILTERING WATER OR WASTEWATER

(71) Applicant: ROBERTS MARKETING DE, INC., Wilmington, DE (US)

(72) Inventor: R. Lee Roberts, Rose Valley, PA (US)

(73) Assignee: Roberts Marketing DE, Inc., Wilmington, DE (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/302,363

(22) Filed: Jun. 11, 2014

(65) Prior Publication Data

US 2015/0068988 A1 Mar. 12, 2015

Related U.S. Application Data

(63) Continuation of application No. 13/317,737, filed on Oct. 27, 2011, now Pat. No. 8,889,015, which is a continuation-in-part of application No. 12/926,968, filed on Dec. 21, 2010, now Pat. No. 8,454,841, which is a continuation-in-part of application No. 12/662,897, filed on May 11, 2010, now Pat. No. 8,317,036.

(51) Int. Cl.

| B01D 24/20 | (2006.01) |
|---|---|
| B01D 24/46 | (2006.01) |
| B01D 24/24 | (2006.01) |
| B01D 24/30 | (2006.01) |
| C02F 1/00 | (2006.01) |
| B01D 24/00 | (2006.01) |

(52) U.S. Cl.
CPC ......... *B01D 24/4626* (2013.01); *B01D 24/001* (2013.01); *B01D 24/205* (2013.01); *B01D 24/24* (2013.01); *B01D 24/305* (2013.01); *B01D 24/4631* (2013.01); *B01D 24/4673* (2013.01); *C02F 1/004* (2013.01); *B01D 23/16* (2013.01); *B01D 23/24* (2013.01); *C02F 2303/16* (2013.01); *Y10T 29/49826* (2015.01)

(58) Field of Classification Search
CPC . B01D 24/24; B01D 24/4631; F16L 41/021; C02F 1/004; C02F 2303/16; C02F 23/16; C02F 23/24
USPC .............. 210/150, 274, 279; 285/145.4
See application file for complete search history.

(56) References Cited

U.S. PATENT DOCUMENTS

| 5,534,202 A * | 7/1996 | Roberts | B01D 24/24 210/274 |
|---|---|---|---|
| 8,889,015 B2 * | 11/2014 | Roberts | B01D 24/24 210/795 |
| 2003/0116962 A1 * | 6/2003 | Magennis | F16L 41/02 285/133.21 |

* cited by examiner

Primary Examiner — Matthew O Savage
(74) Attorney, Agent, or Firm — Merek, Blackmon & Voorhees, LLC

(57) ABSTRACT

An apparatus for removing impurities from water and/or wastewater and a method of washing a filter having a filter bed for filtering water or wastewater. In the most preferred form of the invention, the fluid distribution system is an air scour system for directing air through the filter bed to assist in cleaning of the filter bed to remove impurities trapped in the filter bed during a service run. In the most preferred form, the air scour system includes an adapter for permitting adjustment of at least one component of the air scour system during installation.

12 Claims, 31 Drawing Sheets

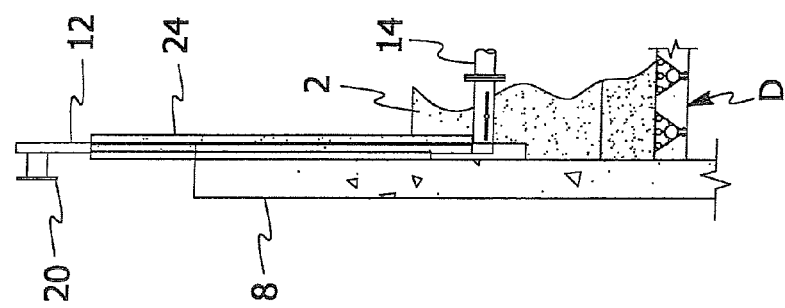
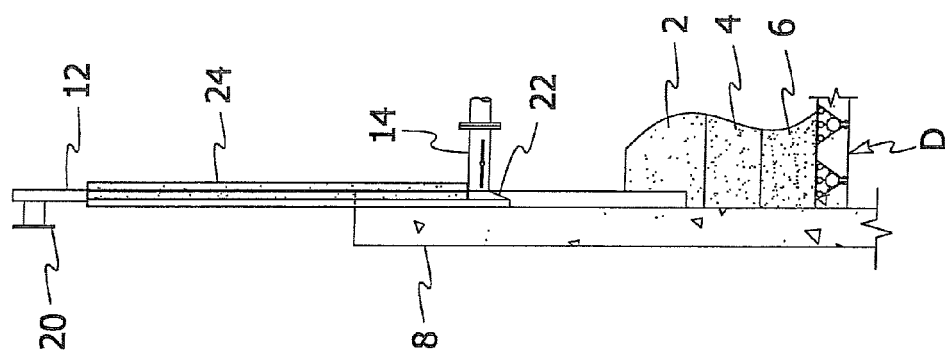

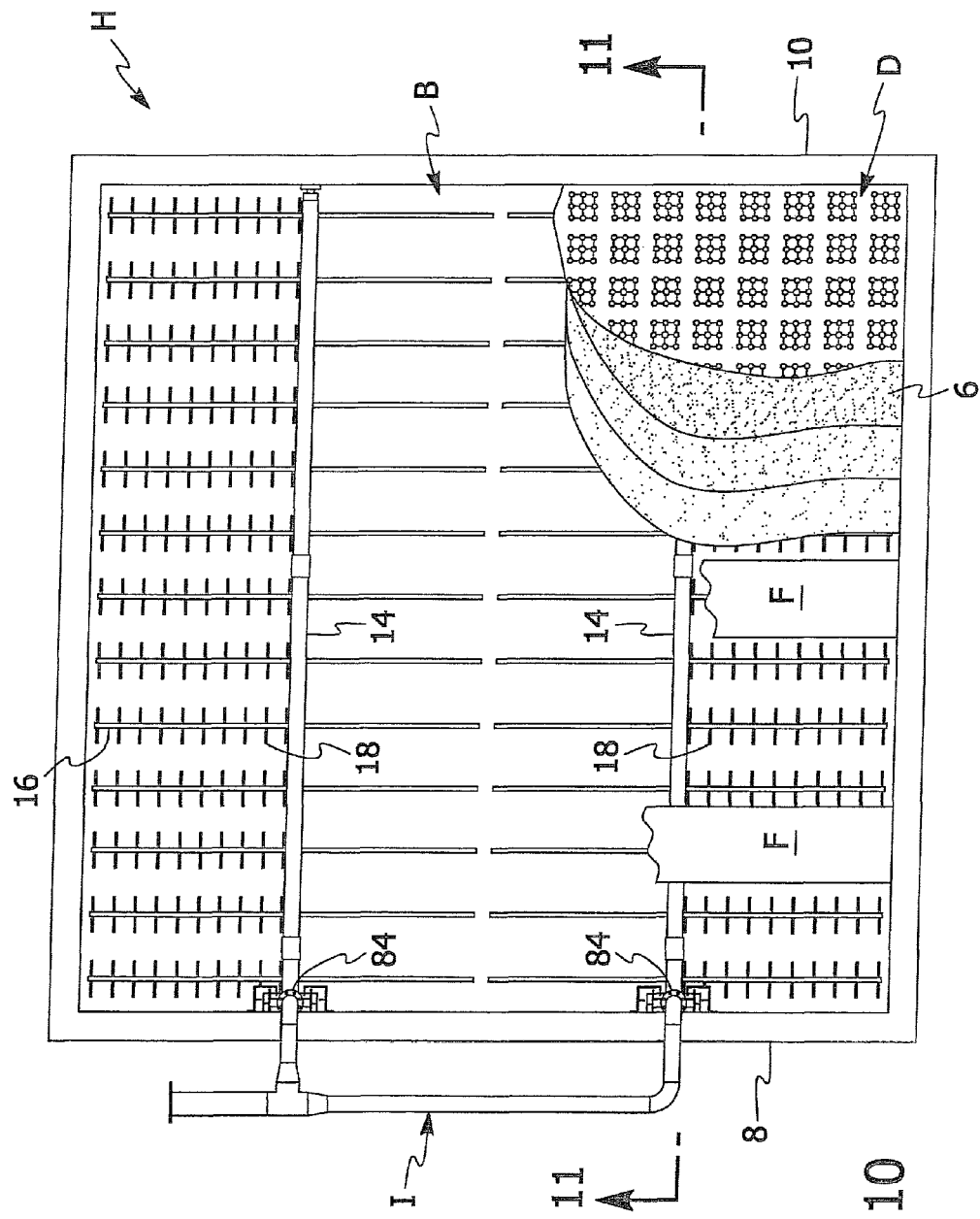

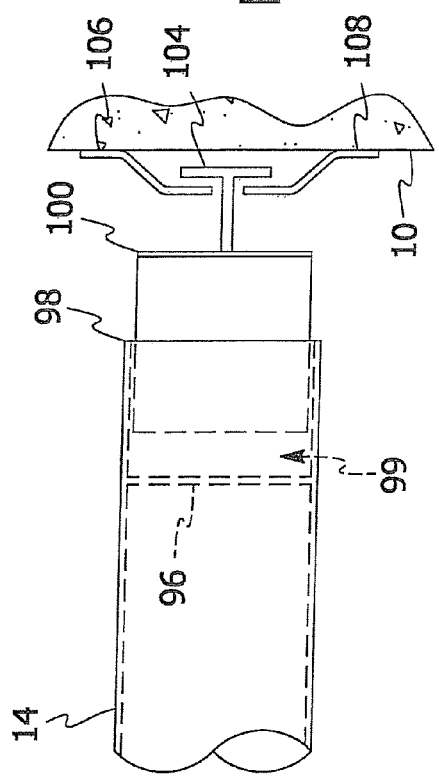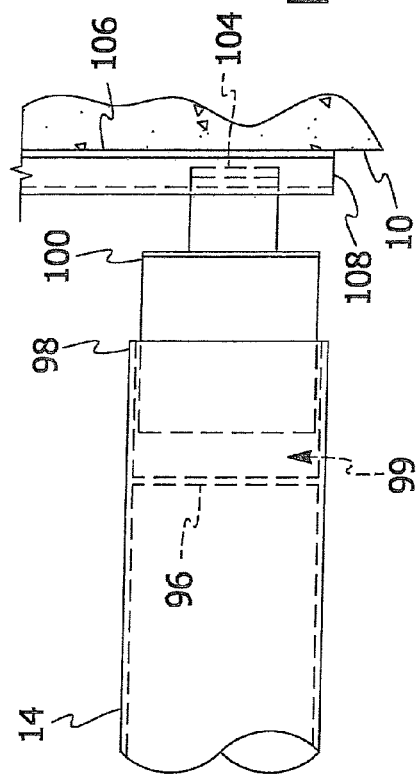

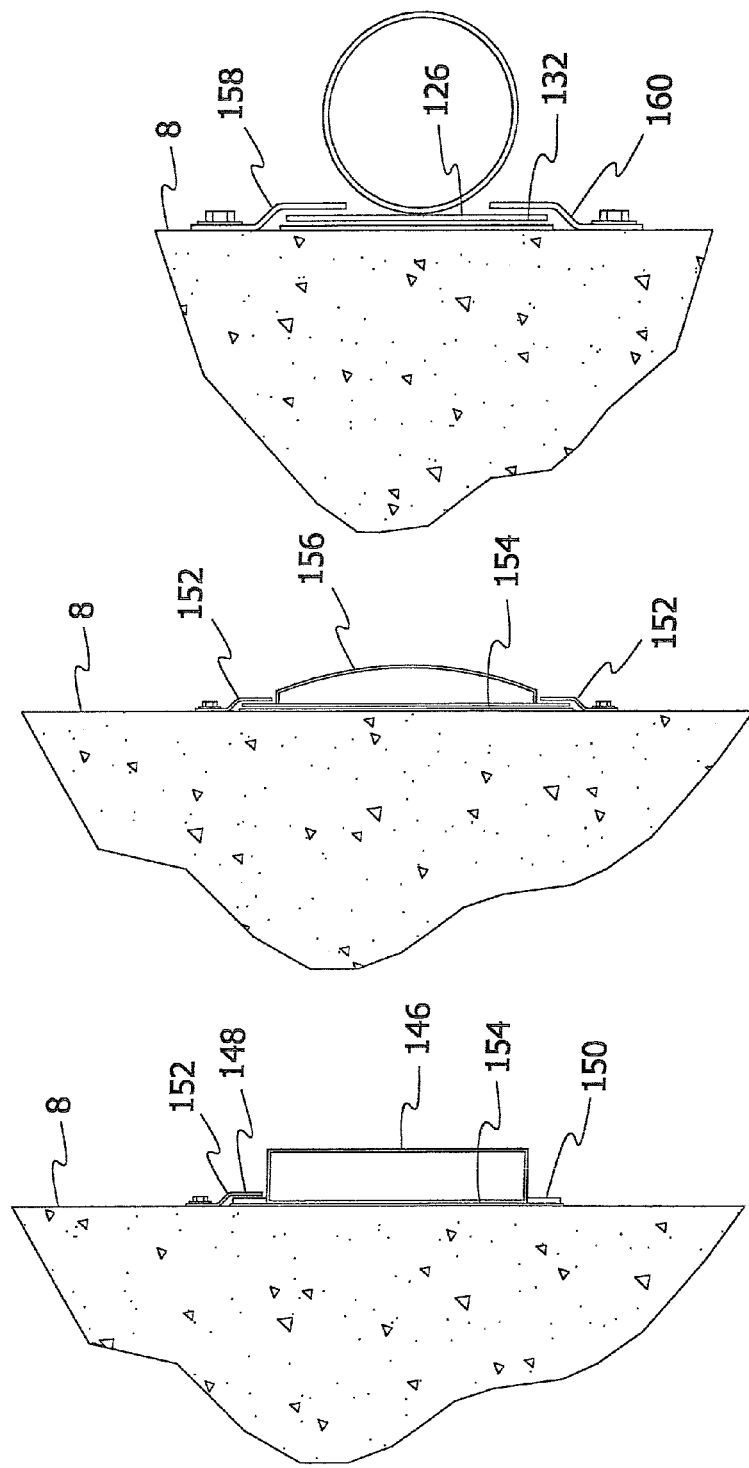

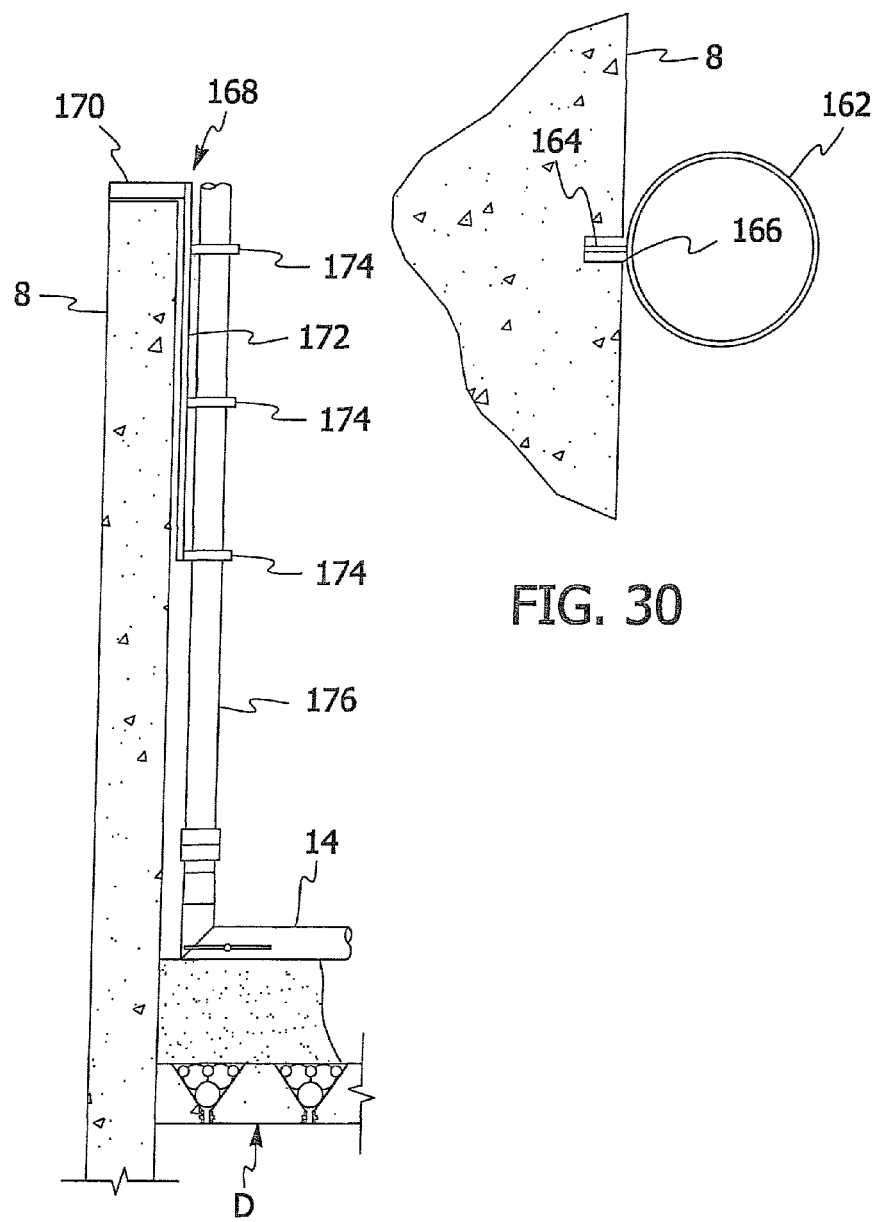

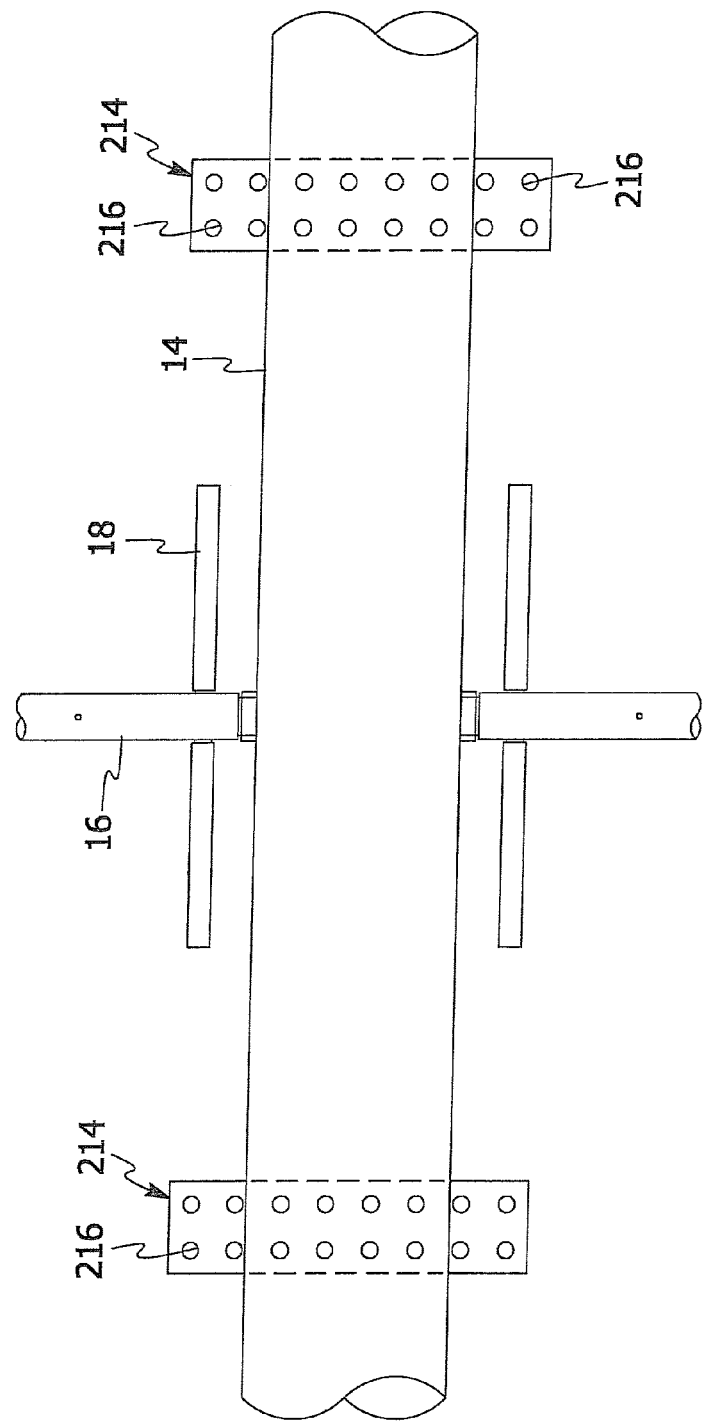

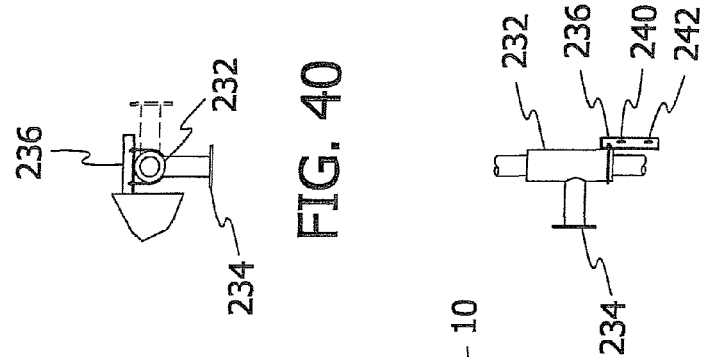
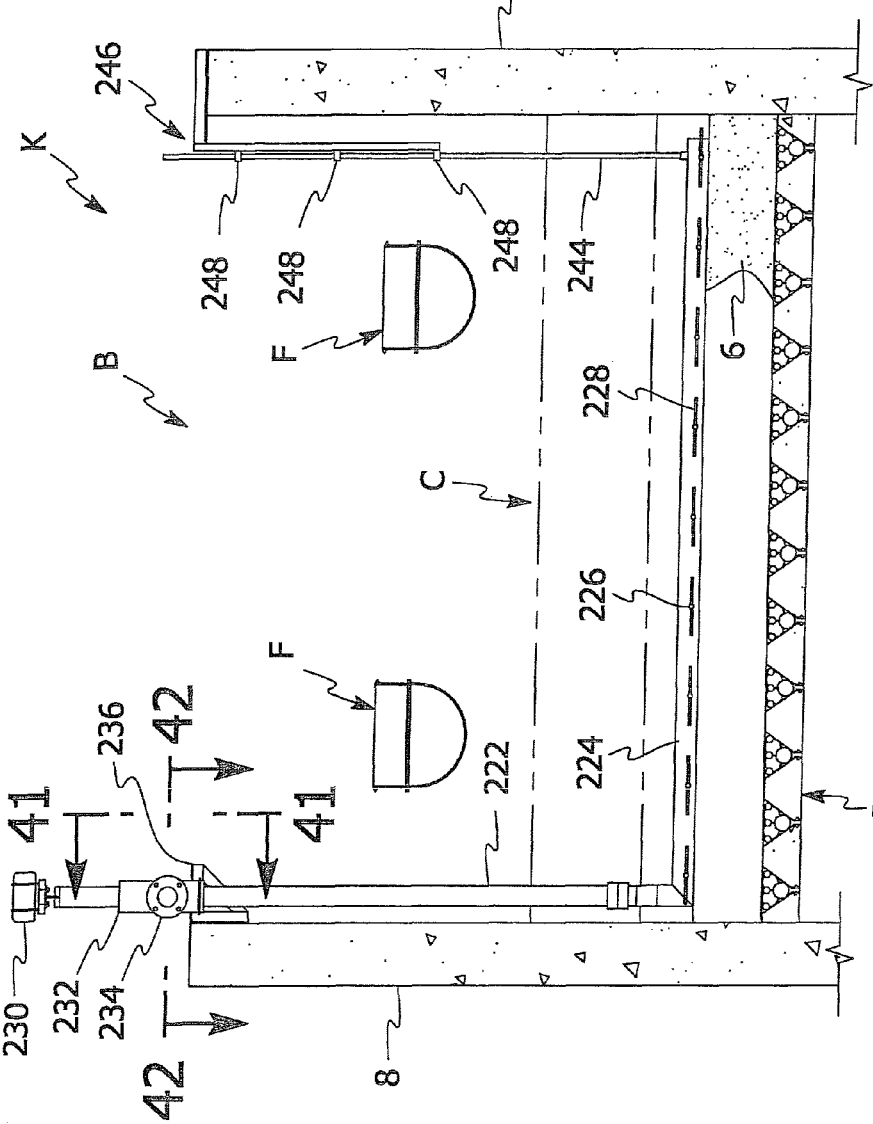

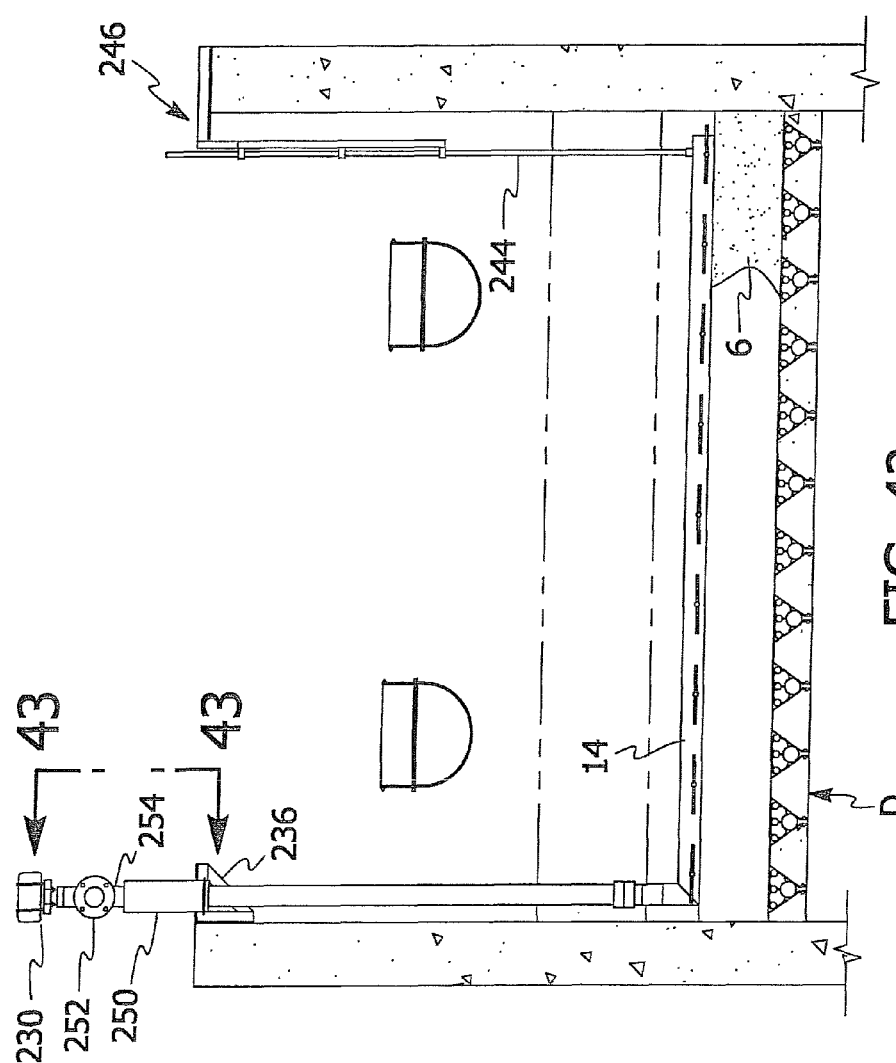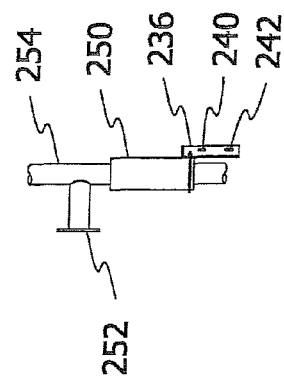

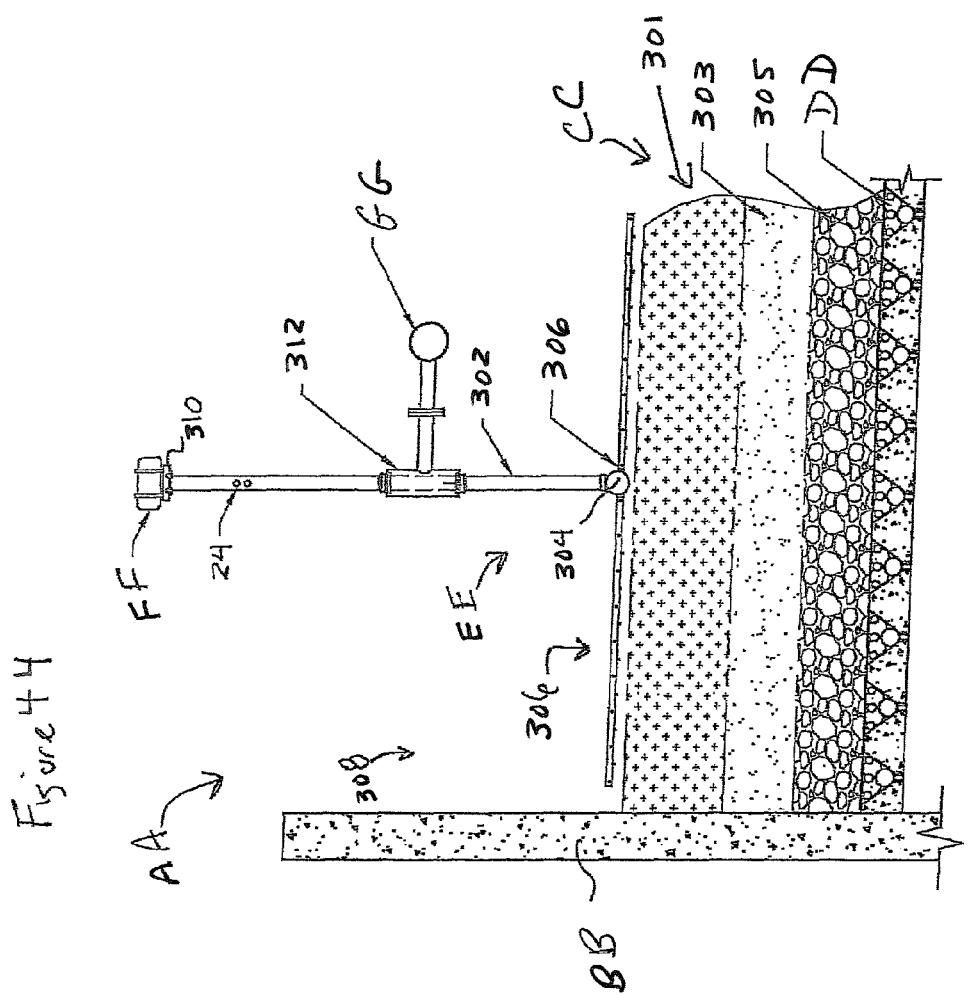

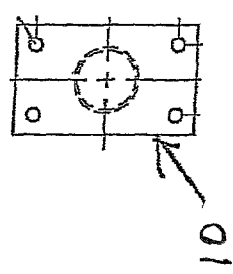
Figure S2
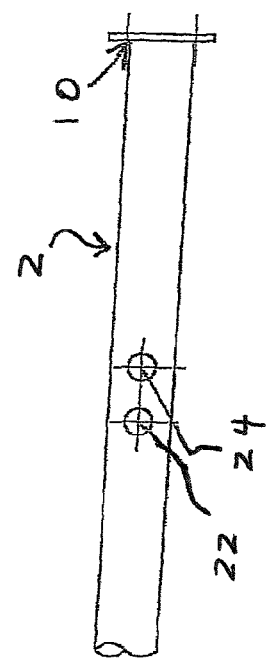
Figure S1

METHOD FOR WASHING A FILTER FOR FILTERING WATER OR WASTEWATER

RELATED PATENT APPLICATIONS

The subject patent application is a continuation of application Ser. No. 13/317,737 filed on Oct. 27, 2011, the entire contents of which are incorporated herein by reference which is a continuation-in-part of U.S. patent application Ser. No. 12/926,968 filed on Dec. 21, 2010, the entire contents of which are incorporated herein by reference which is a continuation-in-part of U.S. patent application Ser. No. 12/662,897 filed on May 11, 2010, the entire contents of which are incorporated herein by reference.

FIELD OF THE INVENTION

The present invention is directed to an apparatus for removing impurities from water and/or wastewater and a method of installing a fluid distribution system in said apparatus and a method of washing the apparatus using the fluid distribution system. More specifically, the present invention is directed to a filter for removing impurities from water and/or wastewater and a method of installing a fluid distribution system in the filter and a method of washing the filter using the fluid distribution system. The filter can take many forms including but not limited to an upflow filter or clarifier, a downflow filter or clarifier and a biflow filter. The filter typically will include a filter bed having at least one layer of filter media in which influent passes through to remove impurities. In the most preferred form of the invention, the fluid distribution system is an air scour system for directing air through the filter bed to assist in cleaning of the filter bed to remove impurities trapped in the filter bed during a service run. In the most preferred form, the air scour system includes an adapter for permitting adjustment of at least one component of the air scour system during installation. In the most preferred form, the method of installing the fluid distribution system in the filter bed is performed by imparting a force to the filter bed to permit the fluid distribution system to be installed in the filter bed without removing media from the filter bed. In one preferred form, the fluid distribution system is configured such that any necessary manual manipulation of the fluid distribution system as the fluid distribution system is installed in the filter bed can be readily performed by one or more individuals positioned on the outside of the filter compartment or by one or more individuals positioned on one or more walls of the filter compartment.

BACKGROUND OF THE INVENTION

Various filters have been employed to remove at least some impurities from water or wastewater. Prior filters include but are not limited to upflow filters or upflow clarifiers, downflow filters and bi-flow filters. Typically, filters include a filter bed with one or more layers of granular media. During a filtration cycle or service run, influent (i.e., liquid to be filtered) is directed through the filter bed to remove impurities from influent. Various devices have been used to direct influent through the filter bed and collect effluent (i.e., filtered liquid). For example, underdrains formed from a plurality of laterals have been used below the filter bed in upflow filters and upflow clarifiers to direct influent through the filter bed. One or more layers of gravel have been used to support one or more layers of filter media above the underdrain laterals. Porous plates operably connected to each of the plurality of underdrain laterals have been used to support one or more layers of filter media in the filter bed above the underdrain laterals to eliminate the need for gravel support layers. Alternatively, underdrains having a plurality of nozzles arranged below the filter bed have been used in upflow filters and upflow clarifiers to direct influent through the filter bed during a filtration cycle or service run. In downflow filters or clarifiers, underdrains are used to collect effluent. Underdrains are also used in both upflow filters and downflow filters during periodic cleaning cycles to direct a washing liquid through the filter bed to remove impurities trapped in the filter bed during a filtration cycle. To assist in the cleaning of filter beds, air may be directed through the filter bed during a washing or cleaning cycle. The washing or cleaning cycle can include several phases including but not limited to liquid only, liquid and air concurrently and air only.

U.S. Pat. Nos. 5,534,202 and 5,673,481 disclose, inter alia, a known method of inserting an air grid into a filter bed to assist in cleaning of the filter bed. Specifically, these patents disclose fluidizing the filter bed to permit insertion of the air grid in the filter bed without removing filter media from the filter bed. While this was a significant improvement over prior systems, there are instances where fluidization of the filter bed is not practical and/or possible. One aspect of a preferred embodiment of the present invention is to use a vibrator to insert an air grid into a filter bed without fluidizing the filter bed and without removing filter media from the filter bed. Regardless of the manner in which media in the filter bed is agitated to permit a fluid distribution system to be inserted at least partially in the filter bed without removing media, it is important that the fluid distribution system be able to be installed during agitation of the filter bed without one or more individuals located directly above the filter bed to guide the fluid distribution system to an operating position. For example, where the media is fluidized to install the fluid distribution system, liquid passing through the filter bed can create a safety hazard for individuals that are positioned above the filter bed to guide the fluid distribution system into an operating position. Therefore, one aspect of a preferred embodiment of the present invention is to provide a fluid distribution system that eliminates the need for one or more individuals to be positioned above the filter bed to guide the fluid distribution system into an operating position. Again, regardless of the manner in which the filter bed is agitated to permit the fluid distribution, it is important that the fluid distribution system be properly oriented when installed. The agitation of the filter media during installation can cause the fluid distribution system to be improperly oriented when installed. This is particularly true where the fluid distribution system is large. Hence, another aspect of a preferred embodiment of the present invention is to provide a fluid distribution system that can be readily installed in an orientation that optimizes the effectiveness of the fluid distribution system. Drop pipes are used in fluid distribution systems to supply a washing fluid to other elements of the fluid distribution systems including one or more headers and a plurality of laterals operably associated with the one or more headers. If the drop pipe has a crack or other defect, influent during the filtration cycle can enter the drop pipe and pass downwardly through the filter without traveling through the filter bed. This is referred to as short circuiting of the filter bed. A further aspect of a preferred embodiment of the present invention is to provide a fluid distribution system that eliminates or significantly reduces short circuiting of the filter bed. Yet a further aspect of a preferred form of the present invention is to provide a fluid distribution system that readily informs an operator of the presence of liquid in one or more drop pipes signaling a defect in the drop pipe that could result in short circuiting of the filter bed.

Where air scour systems are used to assist in cleaning of the filter bed, it is typical for components of the air scour system including but not limited to drop pipes to at least partially fill with liquid when the air scour system is not operating to direct air through the filter bed. This is undesirable as the liquid must be evacuated from the air scour system when the air scour system is employed to direct air through the filter bed. Another aspect of the preferred embodiment of the present invention is directed to a fluid distribution system configured to prevent one or more components of the air scour system from filling with liquid.

In one preferred embodiment, the fluid distribution system includes an adapter that permits height and/or rotational adjustment of a drop pipe to facilitate installation of the fluid distribution system. The adapter can be used in any suitable fluid distribution system regardless of how the fluid distribution system is installed in the filter bed, i.e., the adapter is not limited to instances in which a vibrator is used to install the fluid distribution system or instances in which a particular guide mechanism is used to guide the fluid distribution system into an operating position.

OBJECTS AND SUMMARY OF THE INVENTION

An object of the present invention is to provide a novel and unobvious apparatus and method for removing impurities from water and/or wastewater.

Another object a preferred embodiment of the present invention is to provide a fluid distribution system with an adapter that permits height and/or rotational adjustment of a drop pipe to facilitate installation of the fluid distribution system.

Another object of a preferred embodiment of the present invention is to provide a fluid distribution system that can be readily installed in a filter bed without removing media from the filter bed.

A further object of a preferred embodiment of the present invention is to provide a fluid distribution system that can be readily installed in a filter bed without fluidizing the filter bed and without removing media from the filter bed.

Still a further object of a preferred embodiment of the present invention is to provide a fluid distribution system configured such that during installation manual manipulation of the fluid distribution system can be performed by one or more individuals positioned outside of the filter compartment or housing or by one or more persons positioned on one or more walls of the filter compartment or housing.

Yet another object of a preferred embodiment of the present invention is to provide a fluid distribution system that eliminates or significantly reduces short circuiting of the filter bed.

Yet a further object of a preferred embodiment of the present invention is to provide a fluid distribution system that can be readily installed in a filter bed in an optimum orientation despite the fact that installation of the fluid distribution system occurs while a force is imparted on the filter bed to agitate the media in the filter bed.

Still a further object of a preferred embodiment of the present invention is to provide an air scour system that automatically prevents liquid from filling at least one component of the air scour system when the air scour system is not providing air to the filter bed.

Another object of a preferred embodiment of the present invention is to provide an air scour system that readily informs an operator of the presence of liquid in at least a portion of the air scour system.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to apparatus for filtering water or wastewater. The apparatus includes a filter having a filter bed in which at least some impurities are removed from influent and an air grid disposed in the filter bed for directing air through at least a portion of the filter bed during washing of the filter bed. The air grid includes a drop pipe, at least one header and at least one lateral. An adapter is operably associated with the drop pipe for permitting vertical adjustment of the drop pipe. The adapter forms an air chamber along a portion of the drop pipe between a first end of the drop pipe and a second end of the drop pipe. The drop pipe has at least one orifice in communication with the air chamber such that air from the air chamber passes into the drop pipe and travels downwardly through the drop pipe during washing of the filter bed.

Another preferred embodiment of the present invention is directed to a method for washing a filter for filtering water or wastewater. The method includes the steps of: (a) providing a filter having a filter bed in which at least some impurities are removed from influent; (b) positioning an air grid disposed in the filter bed, the air grid being configured to direct air through at least a portion of the filter bed during washing of the filter bed, the air grid including a drop pipe, at least one header and at least one lateral; (c) providing an adapter operably associated with the drop pipe for permitting vertical adjustment of the drop pipe, the adapter forming an air chamber along a portion of the drop pipe between a first end of the drop pipe and a second end of the drop pipe, the drop pipe having at least one orifice in communication with the air chamber such that air from the air chamber passes into the drop pipe and travels downwardly through the drop pipe during washing of the filter bed; and, (d) directing air through the air grid into the filter bed to remove impurities trapped in the filter bed during a filtration cycle such that air passes through the air grid into the filter bed.

A further preferred embodiment of the present invention is directed to an air grid for providing air in a filter bed of a filter for filtering water or wastewater during a washing cycle. The air grid includes a drop pipe, at least one header and at least one lateral. The air grid further includes an adapter operably connected to the drop pipe for permitting vertical adjustment of the drop pipe. The adapter forms an air chamber along a portion of the drop pipe between a first end of the drop pipe and a second end of the drop pipe. The drop pipe has at least one orifice in communication with the air chamber such that pressurized air from the air chamber passes into the drop pipe and travels downwardly through the drop pipe during washing of the filter bed.

BRIEF DESCRIPTION OF THE DRAWINGS

FIG. 5 is a fragmentary cross-sectional view of a filter illustrated in FIG. 1 showing a portion of the fluid distribution assembly at the beginning of the installation process.

FIG. 6 is a fragmentary cross-sectional view of a filter illustrated in FIG. 1 showing a portion of the fluid distribution assembly at an intermediate stage of the installation process in which the filter bed is fluidized.

FIG. 10 is an plan view of a filter formed in accordance with another preferred embodiment of the present invention.

FIG. 21 is a fragmentary plan view of a portion of the filter identified by brackets B-B in FIG. 17 illustrating the preferred interrelationship of the adjustment member, right end of the air header and pair of spaced guide rails disposed adjacent a wall of the filter compartment.

FIG. 22 is a side view of the components depicted in FIG. 21.

FIGS. 24 to 30 are fragmentary cross-sectional views taken along a horizontal plane through the drop pipe, guide member and filter compartment of various alternative embodiments of the present invention.

FIG. 31 is a fragmentary cross-sectional view of a filter illustrating yet a further alternative embodiment of the present invention.

FIG. 35 is a fragmentary plan view of a further alternative embodiment of the fluid distribution system.

FIG. 39 is a cross-sectional view of a further alternative embodiment of the fluid distribution system of the present invention.

FIG. 40 is a cross-sectional view taken along lines 40-40 in FIG. 39.

FIG. 41 is a cross-sectional view taken along lines 41-41 in FIG. 39.

FIG. 42 is a cross-sectional view of a further alternative embodiment of the fluid distribution system of the present invention.

FIG. 43 is a cross-sectional view taken along lines 43-43 in FIG. 42.

FIG. 44 is a fragmentary cross-sectional view of another preferred embodiment of the present invention depicting an air grid prior into installation into a filter bed.

FIG. 51 is a fragmentary view of a drop pipe formed in accordance with a preferred embodiment of the present invention.

FIG. 52 is a plan view of a drop pipe formed in accordance with a preferred embodiment of the present invention.

DETAILED DESCRIPTION OF THE PREFERRED EMBODIMENTS OF THE INVENTION

The preferred forms of the invention will now be described with reference to FIGS. 1-52. The appended claims are not limited to the preferred forms and no term

FIGS. 1 Through 9

Figure 1:
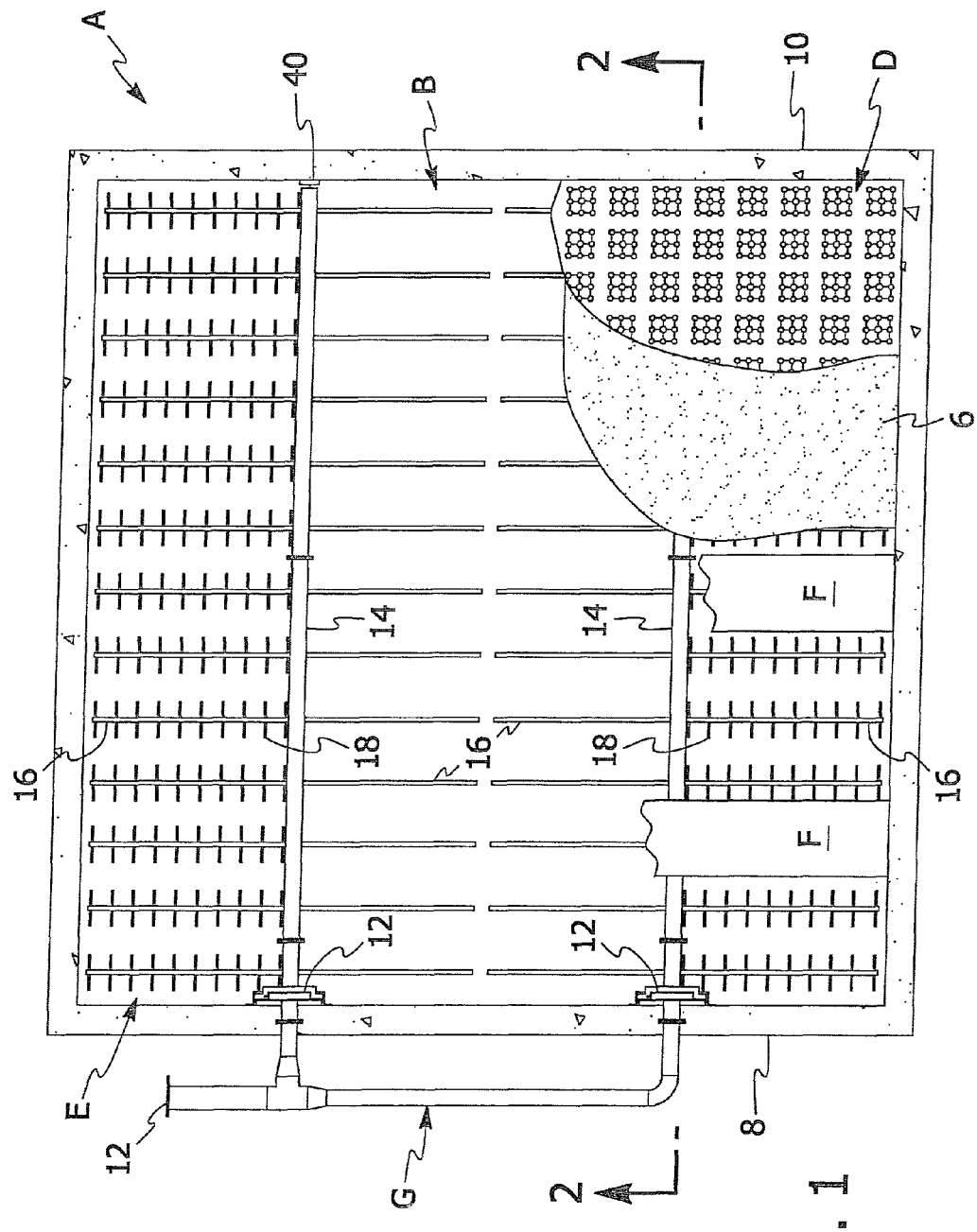
FIG. 1 is a plan view of a filter formed in accordance with a preferred embodiment of the present invention.
Figure 2:
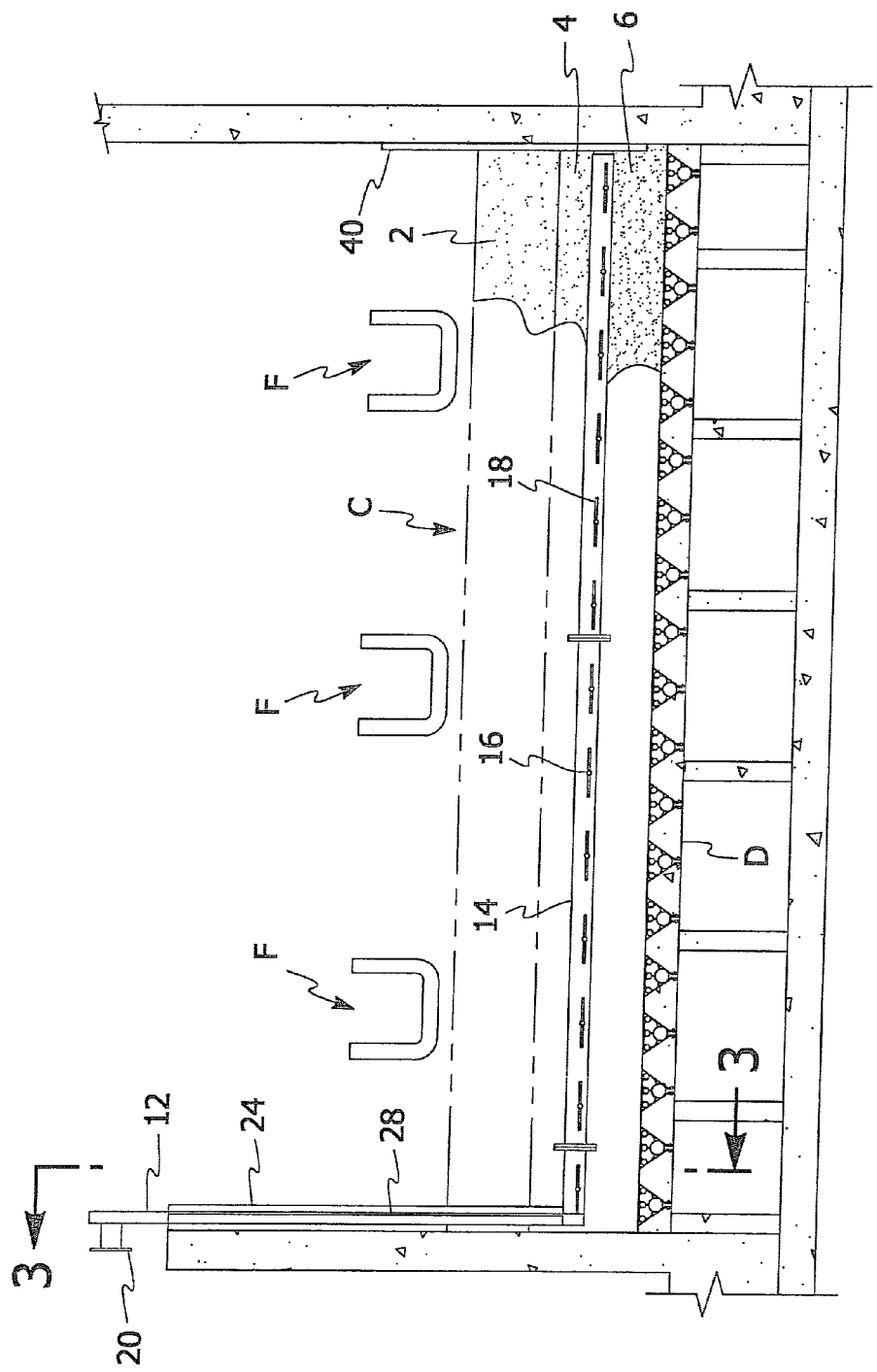
FIG. 2 is a cross-sectional view taken along the lines 2-2 in FIG. 1.
Figure 3:
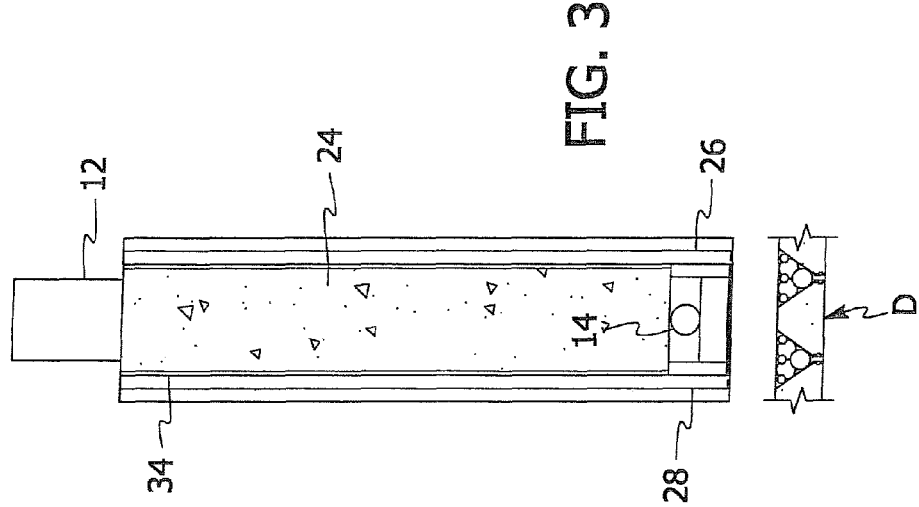
FIG. 3 is a cross-sectional view taken along lines 3-3 in FIG. 2.
Figure 4:
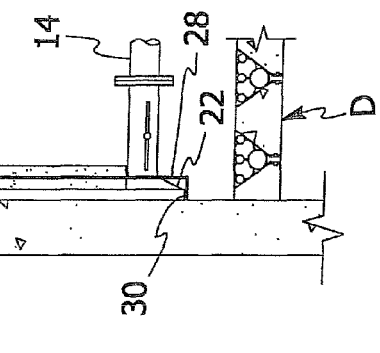
FIG. 4 is a view of the components illustrated in FIG. 3 that has been rotated ninety degrees from the view in FIG. 3.

Referring to FIGS. 1 to 7, a filter system A employing a preferred form of the invention is illustrated in one of many possible configurations. Filter A includes a tank or filter compartment B, a filter bed C, an underdrain D, an air grid system E, wash troughs F and an air supply piping G connected to an air supply source not shown. While filter A as shown in FIGS. 1 and 2 is a downflow filter (i.e., influent is passed downwardly through the filter bed C during filtration), any filter can be used including but not limited to an upflow filter, an upflow clarifier and a bi-flow filter. As used herein, the term filter refers to any device that removes at least some impurities (e.g., foreign matter of any nature including a solid, a liquid or a gas) from water or wastewater. Tank B can be formed from concrete, metal or other suitable material. Further, tank B can be rectangular, circular or any other suitable shape.

As illustrated in FIGS. 1 and 2, filter bed C is formed from two layers of filter media 2 and 4 supported by a layer of gravel 6. It should be understood that the filter bed C could include only one layer of filter media or more than two layers of filter media. The underdrain D illustrated in FIGS. 1 and 2 is a wheeler bottom underdrain. However, any suitable underdrain may be used including an underdrain formed from a plurality of underdrain laterals. The gravel layer 6 can be omitted for example where the underdrain is formed from a plurality of underdrain laterals each having a porous plate to support the filter media.

The air grid system E includes two air grids that are substantially identical. Each of the air grids extend substantially the entire distance between ends walls 8 and 10 of filter compartment B. Each air grid includes a substantially vertically extending drop pipe 12, a substantially horizontally extending air header 14 and a plurality of substantially horizontally extending laterals 16. The laterals 16 each have a plurality of sub-laterals 18 having one or more openings for releasing air into the filter bed C. It should be noted that in FIG. 1 a number of sub-laterals have been removed for purposes of clarity only. The number and spacing of drop pipes, headers, laterals and sub-laterals may be varied as desired. It should be noted that headers 14 may be formed of a plurality of adjoining segments of pipe of any suitable material or configuration.

Referring to FIGS. 3 through 7, each drop pipe 12 has a substantially rectangular cross-section with a supply pipe connection 20. It will be readily appreciated that the shape of the drop pipes 12 can be varied as desired. Preferably, each drop pipe 12 has a tapered lower section 22. Protective shell 24 surrounds at least a portion of the exterior of each drop pipe 12. The protective shell 24 prevents influent in the filter compartment from entering the drop pipe 12 through a crack or other defect in the drop pipe 12. This prevents short circuiting of the filter bed by influent traveling through the drop pipe without passing through each layer of filter media. The protective shell 24 can be formed from concrete or any other suitable material. The protective shell 24 can be formed around the drop pipe 12 prior to installation of the drop pipe into the filter compartment B. Alternatively, the protective shell may be formed around the drop pipe 12 after the drop pipe is installed in the filter compartment B.

Referring to FIGS. 3 to 7, two vertically extending guide members 26 and 28 are preferably attached to the inner surface of end wall 8. A horizontally extending bottom wall 30 connects the lower portions of guide members 26 and 28. Tapered lower end 22 of drop pipe 12 seats on bottom wall 30 when drop pipe 12 assumes an operating position. Drop pipe guides 32 and 34 preferably extend from each side of drop pipe 12 and cooperate with guide members 26 and 28 to allow the drop pipe 12 to be readily installed in an optimum orientation in filter compartment B as is shown in FIGS. 5 and 6. Drop pipe guides 32 and 34 also space the drop pipe 12 from end wall 8 a sufficient distance so that a sealing substance 36 may be backfilled after the drop pipe assumes the operating position. The sealing substance 36 may be grout or any other suitable substance. The sealing substance 36 acts similarly to protective shell 24 to prevent short circuiting of the filter bed. Preferably, drop pipe 12 includes a plurality of water stops 38. Water stops 38 restrict liquid from flowing around the drop pipe 12 in any space between protective shell 24 and drop pipe 12. Water stops 38 can extend substantially the entire length of drop pipe 12 or any portion thereof. Referring to FIGS. 1 and 2, a guide member 40 may be secured to end wall 10 opposite drop pipe 12 to serve as a guide for the end of header 14 opposite of drop pipe 12.

The air grid system E as described above preferably is inserted in filter bed C without removing media from the filter bed C. For example, filter bed C can be sufficiently agitated by fluidization as disclosed in U.S. Pat. Nos. 5,534,202 and 5,673,481 to allow the air grid system E to be installed in the filter bed C without removing media. Other forces may be applied to sufficiently agitate the filter media to allow the air grid system E to be installed in filter bed C without removing media from filter bed C. For example, a vibrator may be operably connected to the air grid system E to vibrate the air grid system which in turn imparts the necessary force to filter bed C to allow the air grid system E to be inserted in the filter bed without removing media. U.S. patent application Ser. No. 12/926,968, the entire contents of which are incorporated herein by reference, discloses such an arrangement.

Each of the air grids of the air grid system E as described above may be substantially completely assembled at the time of installation. For example, the drop pipe 12, header 14, laterals 16 and sub-laterals 18 for each air grid may be operably connected prior to installation. Alternatively, the drop pipe 12 can be partially inserted in the guide members 26 and 28 such that the lower portion rests on the uppermost portion of filter layer 2. The remaining portions of the air grid (e.g. header 14, laterals 16 and sub-laterals 18) may be assembled prior to installation in the filter compartment or after installation in the filter compartment. The drop pipe 12 may connected to header 14 while both components are in filter compartment B. Once the drop pipe 12 is operably connected to the remaining portions of the air grid (e.g. header 14, laterals 16 and sub-laterals 18), a force can be imparted on the filter media directly (e.g., fluidizing media) or indirectly (e.g., vibrating an air grid) to allow the air grid system to assume its operating position as illustrated in FIG. 2 where it is embedded at least partially in filter bed C. During the step of sufficiently agitating the media to allow the air grid system to move to its operating position, the air grid system E can be manually manipulated (via drop pipes 12 and guides 26 and 28) by one or more individuals from outside of the filter compartment B or by one or more individuals positioned on the walls of the filter compartment B. This is particularly advantageous where the filter bed C is fluidized as no individual need be in a position in which the individual is subjected to the fluidizing liquid as when an individual is located directly above the filter bed to manually manipulate the air grid to assume its operating position.

Figure 9:
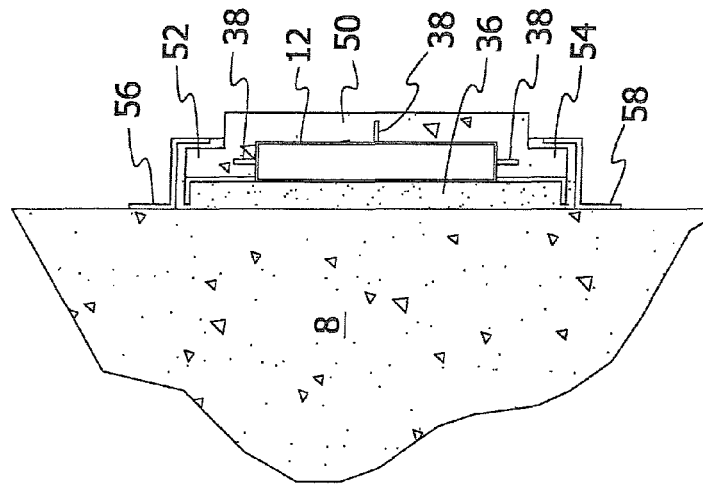
FIG. 9 is a view similar to that depicted in FIG. 7 illustrating another alternative embodiment.
Figure 7:
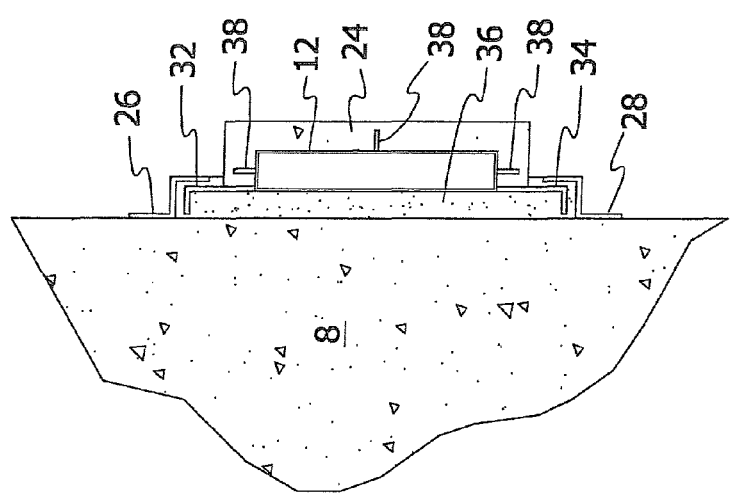
FIG. 7 is a fragmentary cross-sectional view taken along a horizontal plane through the drop pipe, guide member and filter compartment.
Figure 8:
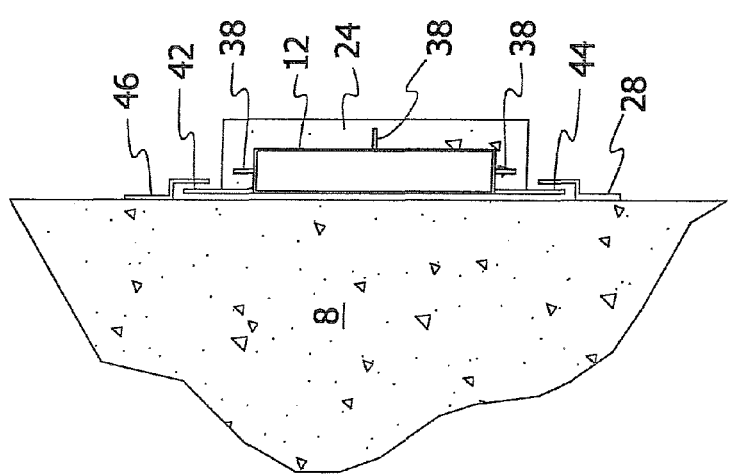
FIG. 8 is a view similar to that depicted in FIG. 7 illustrating an alternative embodiment.

Referring to FIGS. 8 and 9, two alternative forms of drop pipe configurations are illustrated. As these drop pipe arrangements are similar to the arrangement describe above in connection with FIGS. 1 to 7, only the differences will be explained in detail. The same reference numerals are used to identify common components as is the case throughout this Specification. In FIG. 8, drop pipe 12 has guide legs 42 and 44 extending from each side to engage guide members 46 and 48, respectively. Guide legs 42 and 44 extend substantially parallel to end wall 8. This arrangement could be employed where no grout is necessary. Referring to FIG. 9, protective shell 50 of drop pipe 12 includes outwardly extending legs 52 and 54 that cooperate with guide members 56 and 58 to readily install and optimally orient the air grid.

FIGS. 10 Through 31

Referring to FIGS. 10 to 22, a filter system H employing another preferred form of the invention is illustrated in one of many possible configurations. Filter system H is similar to filter system A. Therefore, only the differences will be described in detail. The same reference numerals are used to identify common components in filter system H and filter system A.

Figure 11:
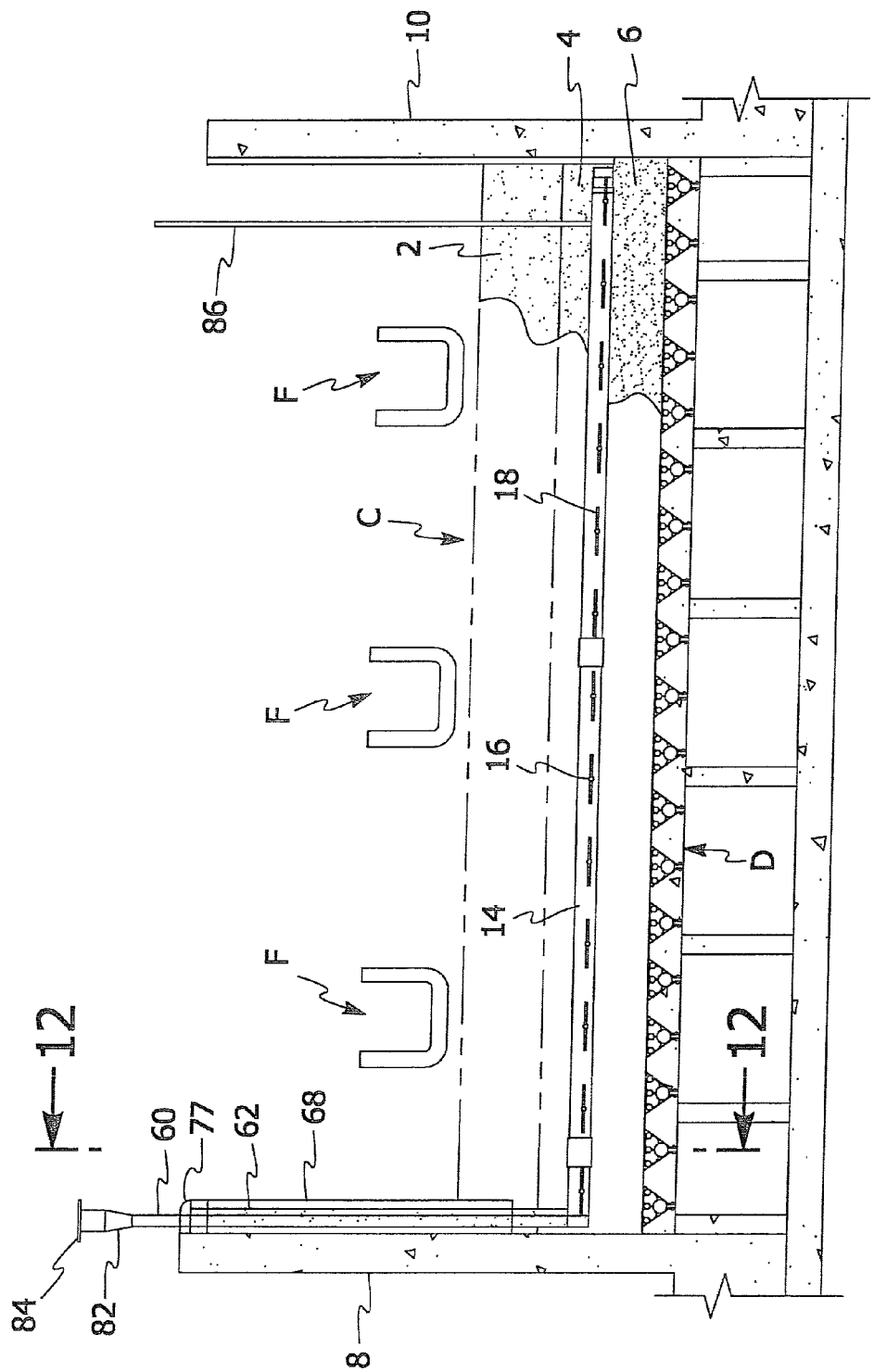
FIG. 11 is a cross-sectional view taken along the lines 11-11 in FIG. 10.
Figure 13:
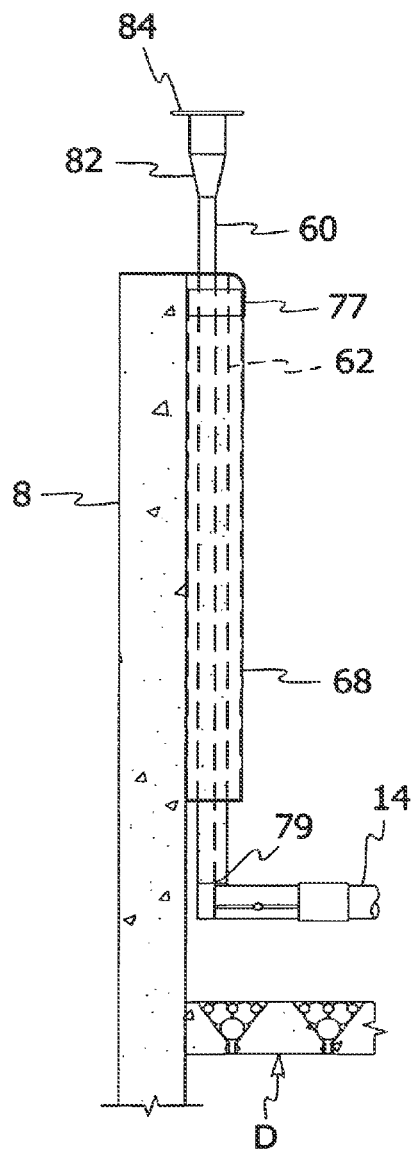
FIG. 13 is a view of the components illustrated in FIG. 12 that has been rotated ninety degrees from the view in FIG. 12.
Figure 12:
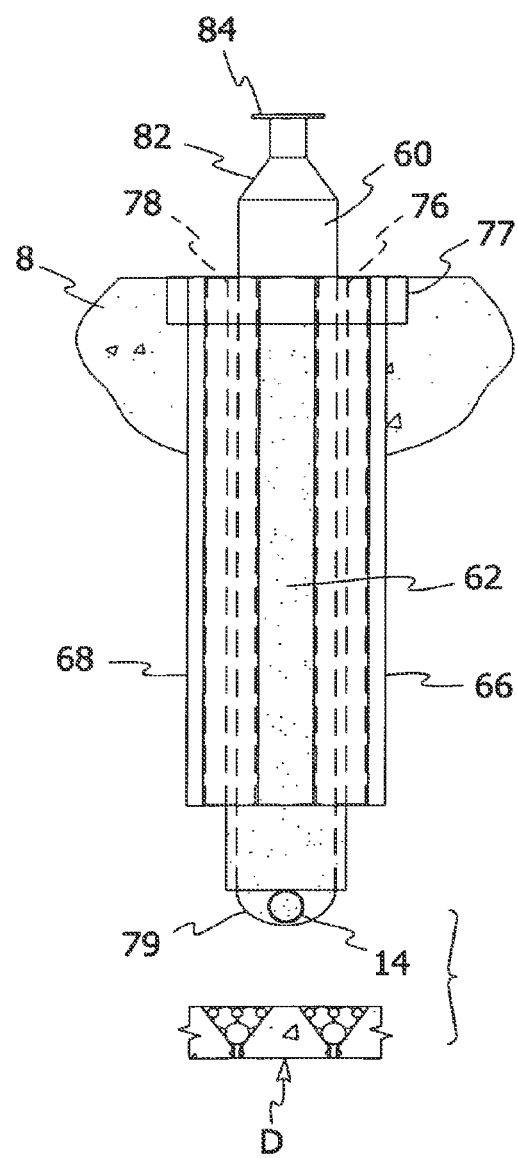
FIG. 12 is a cross-sectional view taken along lines 12-12 in FIG. 11.
Figures 14, 15:
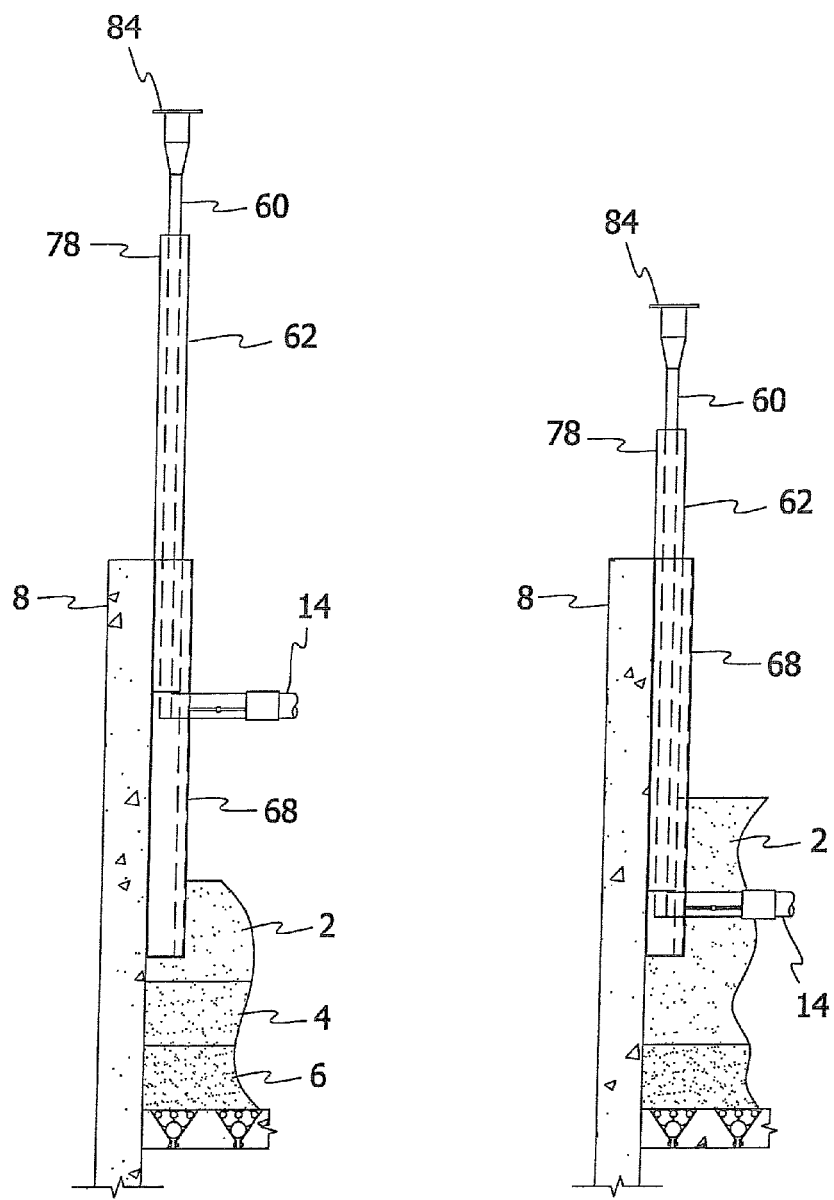
FIG. 14 is a fragmentary cross-sectional view of a filter illustrated in FIG. 10 showing a portion of the fluid distribution assembly at the beginning of the installation process.
FIG. 15 is a fragmentary cross-sectional view of a filter illustrated in FIG. 10 showing a portion of the fluid distribution assembly at an intermediate stage of the installation process in which the filter bed is fluidized.
Figure 16:
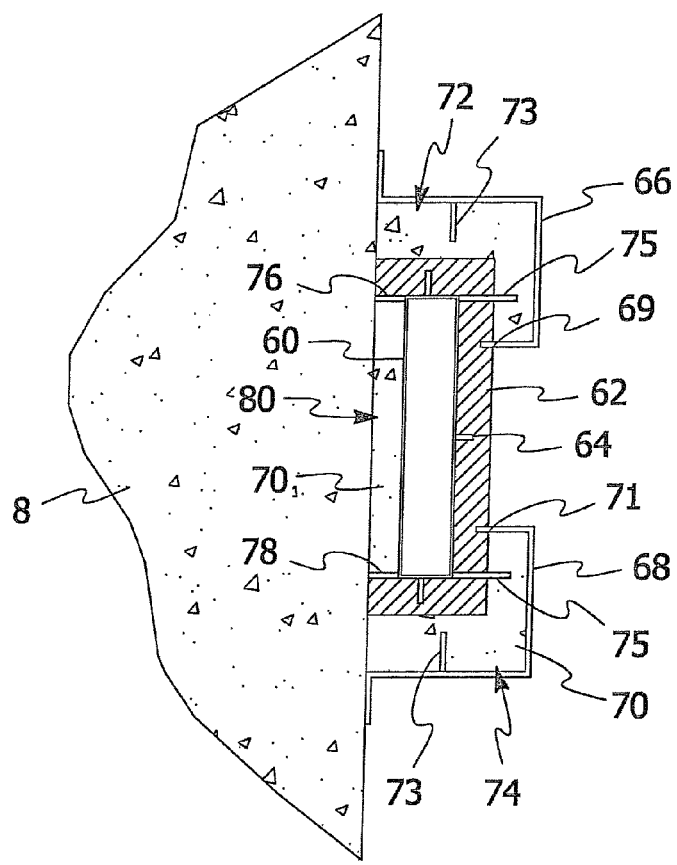
FIG. 16 is a fragmentary cross-sectional view taken along a horizontal plane through the drop pipe, guide member and filter compartment of the filter illustrated in FIG. 10

Referring to FIGS. 10 to 16, the two air girds of this embodiment are substantially identical and each include a substantially rectangular drop pipe 60. A protective shell 62 surrounds drop pipe 60 on three sides as is shown in for example FIG. 16. A water stop 64 restricts the flow of liquid between the exterior of drop pipe 60 and the interior of protective shell 62. Substantially vertically extending guides 66 and 68 are spaced from each other and secured at one end to end wall 8 of filter compartment or tank B and at the other end to protective shell 62. Protective shell 62 includes a pair of spaced grooves 69 and 71 that receive the corresponding ends of guides 66 and 68. A sealing substance 70 including but not limited to grout may be backfilled in the two chambers 72 and 74 formed between guides 66 and 68 and the exterior surface of protective shell 62. Drop pipe 60 may include spacing members 76 and 78 to form a chamber 80 to receive a sealing substance 70. The protective shell 62 and sealing substance 70 prevent influent from entering the drop pipe 60 through a crack or other defect in drop pipe 62 thereby preventing short-circuiting of the filter bed C. Guides 66 and 68 may include water stops 73 to restrict the flow of liquid between sealing substance 70 and guides 66 and 68. Additionally, water stops 75 may be embedded in protective shell 62 to restrict the flow of liquid between sealing substance 70 and the exterior of protective shell 62. Drop pipe 60 may further include a protective cover 77 as shown in FIGS. 11 to 13. The protective cover 77 may include an opening that accommodates the drop pipe so that the cover could be slid over the drop pipe or the drop pipe slid through the cover. Further, the cover may include an additional opening through which grout may be poured to backfill as desired. A transition member 79 may be used to connect the lower portion of drop pipe 60 to air header 14 as show in for example FIGS. 12 and 13.

Referring to FIGS. 11 to 15, a transition member 82 is operably connected to the top of drop pipe 60 in a fluid tight manner to connect drop pipe 60 to air supply connection 84. It should be noted that transition member 82 is able to connect drop pipe 60 and air supply connection 84 despite the fact that drop pipe 60 is not compatible with air supply connection 84 to permit a direct connection between these two components. Referring to FIG. 10, air supply piping I connected to an air source (not shown) and to supply connections 84 of each drop pipe 60.

Figure 17:
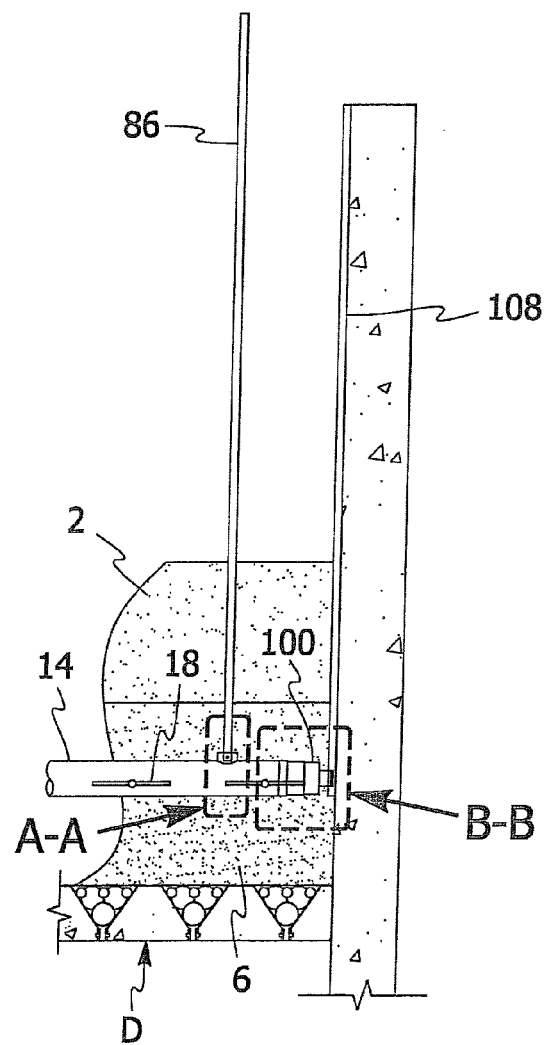
FIG. 17 is a fragmentary cross-sectional view of the filter illustrated in FIG. 10.
Figure 18:
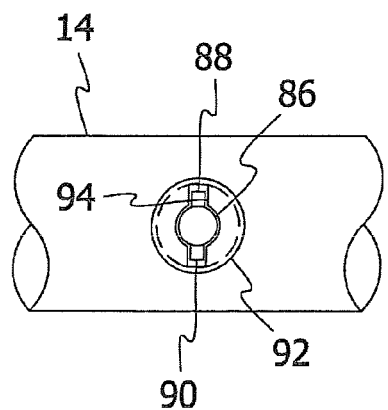
FIG. 18 is a fragmentary plan view of a portion of the filter identified by brackets A-A in FIG. 17 illustrating the preferred interrelationship of the guide pole and air header when the guide pole is in the unlocked position.
Figure 19:
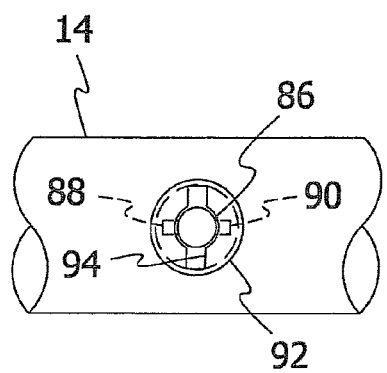
FIG. 19 is a fragmentary plan view of a portion of the filter identified by brackets A-A in FIG. 17 illustrating the preferred interrelationship of the guide pole and air header when the guide pole is in the locked position.
Figure 20:
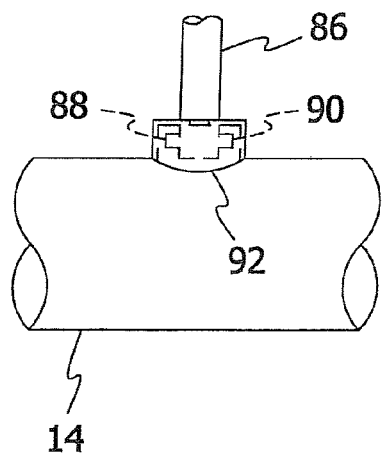
FIG. 20 is a fragmentary side view of a portion of the filter identified by brackets A-A in FIG. 17 illustrating the preferred interrelationship of the guide pole and air header.

Referring to FIGS. 11 and 17, a guide pole 86 may be detachably connected to each air header 14 adjacent filter end wall 10 to assist in the installation of each air grid. The guide pole may include a pair of pins 88 and 90 as seen in FIGS. 18 to 20. Each header 14 may include a receptacle 92 for receiving the lower end of guide pole 86. The receptacle 92 may include a slot 94 for receiving pins 88 and 90 as show in FIG. 18. By merely rotating guide pole 86 ninety degrees from the position shown in FIG. 18 to assume the position shown in FIG. 19, the guide pole 86 can be locked to header 14. Similarly, the guide pole can be readily detached from header 14 by again merely rotating the guide pole from the position in FIG. 19 to the position in FIG. 18. It should be noted that the guide pole 86 can be detachably connected to header 14 in any suitable manner including but not limited to a threaded connection or a hook and loop connection Referring to FIGS. 21 and 22, headers 14 may be provided with an internal sealing plate 96 to seal the air headers 14 upstream of the terminal end 98 of headers 14. The terminal end 98 of each header may be open to form an annular cavity 99 to receive adjustment member 100 which is moveable in annular cavity 99 to permit lateral adjustment of header 14 relative to end walls 8 and 10 of filter compartment or tank B. T-shaped connector 104 extends outwardly from adjustment member 100 to engage vertically extending guide rails 106 and 108 connected to end wall 10. The guide pole 86 and guide rails 106 and 108 allow manual manipulation of the air grids by one or more individuals positioned outside of filter compartment B or by one of more individuals positioned on a wall of filter compartment B, for example, wall 10 to ensure that the air grids will be positioned optimally in filter bed C. The adjustment member 100 readily permits an individual to adjust the position of header 14 relative to guide rails 106 and 108 to facilitate the connection between connector 104 and guide rails 106 and 108.

Figure 24:
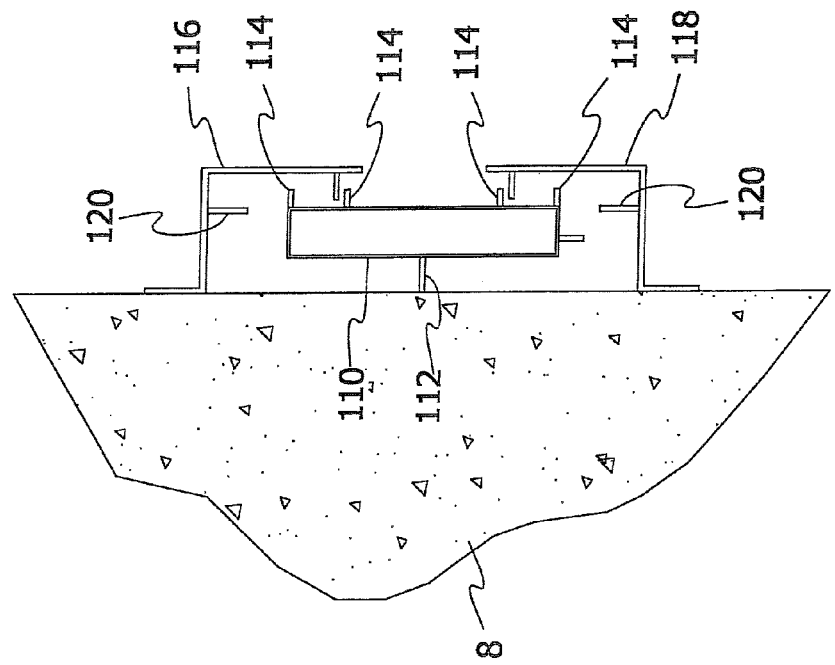
Figure 23:
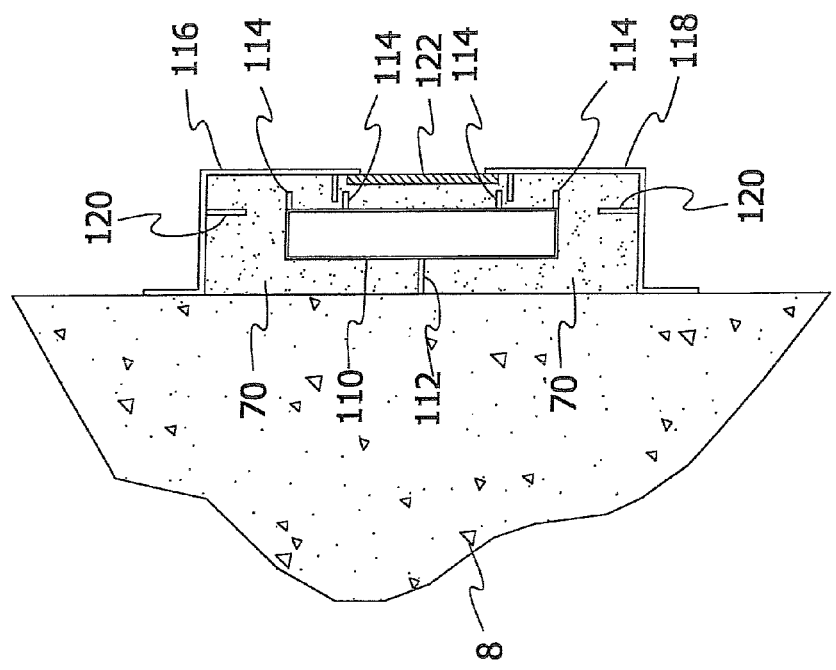
FIG. 23 is a fragmentary cross-sectional view taken along a horizontal plane through the drop pipe, guide member and filter compartment of an alternative embodiment of the present invention.

Referring to FIGS. 23 through 24, various alternative arrangements for drop pipes and related components including guide members will now be discussed. Referring to FIG. 23, drop pipe 110 has a guide leg 112 and four water stops 114. Guide members 116 and 118 are attached at one end to wall 8 and are configured to receive drop pipe 110 and permit drop pipe 110 to move along guide members 116 and 118 when the drop pipe is being installed in filter compartment B to ensure that the corresponding air grid system is optimally oriented in filter bed C. Guide members 116 and 118 may include one or more water stops 120. A slide-in form 122 may be used with guide members 116 and 118 to form a chamber around drop pipe 110 into which sealing substance 70 may be backfilled to form a protective layer around drop pipe 110 to eliminate or at the very least significantly reduce short-circuiting. FIG. 24 illustrates the embodiment in FIG. 23 prior to inserting slide-in form 122 and backfilling with grout.

Figure 25:
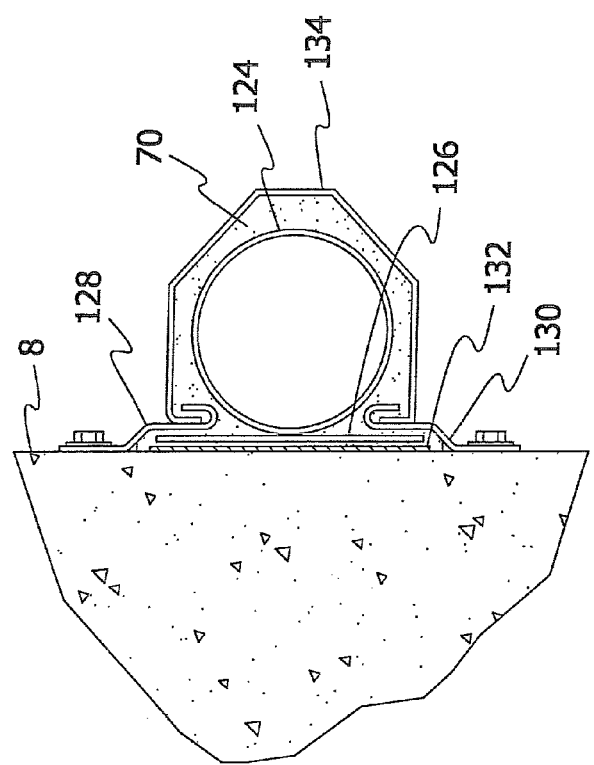

Referring to FIG. 25, drop pipe 124 includes a guide flange 126. Guide flange 126 cooperates with guide rails 128 and 130 to allow an operator to readily and precisely install one or more air grids in a filter. A low friction strip 132 is secured to end wall 8 to facilitate movement of drop pipe 124 relative to guide rails 128 and 130 and end wall 8. It will be readily appreciated that the low friction strip may be formed on flange 126. The ends of guide rails 128 and 130 are configured to permit a protective shell 134 to be readily connected to guide rails 128 and 130. A sealing substance 70 may be backfilled in the chamber formed by the protective shell 134 and guide rails 128 and 130.

Figure 26:
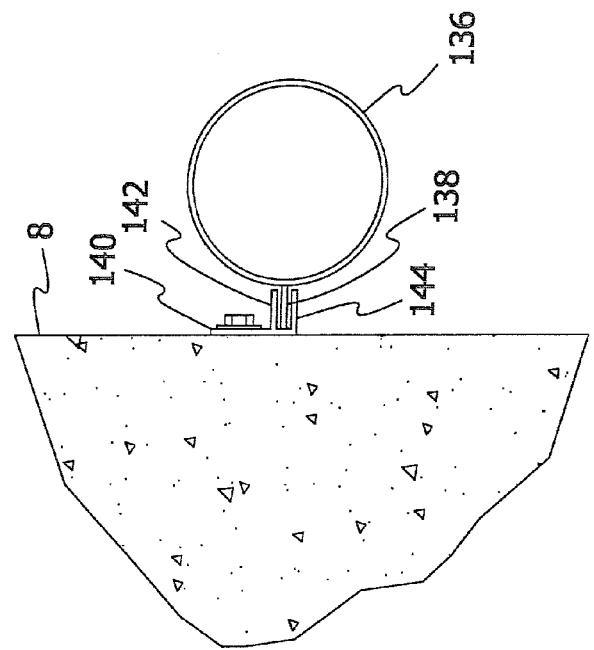

Referring to FIG. 26, drop pipe 136 includes a guide flange 138. Guide flange 138 cooperates with vertically extending guide member 140 secured to end wall 8 by bolts or other fastening means. Guide member 140 includes two spaced rails 142 and 144 that cooperate with guide flange 138 to allow an operator to readily and precisely install one or more air grids in a filter.

Referring to FIG. 27, drop pipe 146 includes a pair of guide flanges 148 and 150 that cooperate with a pair of spaced guide rails 152 (only one of which is shown). Guide flanges 148 and 150 cooperate with corresponding guide rail 152 to allow an operator to readily and precisely install one or more air grids in a filter. A low friction strip 154 may be employed to facilitate relative motion between the drop pipe 146 and end wall 8. Referring to FIG. 28, this embodiment is similar to the embodiment disclosed in FIG. 27 with the exception that the configuration of drop pipe 156 has been modified. Referring to FIG. 29, this embodiment is similar to the embodiment disclosed in FIG. 25 with the exceptions that the protective shell and sealing substance have been omitted. Further, the guide rails 158 and 160 are not configured to receive a protective shell.

Referring to FIG. 30, drop pipe 162 includes a guide flange 164 cooperating with a vertically extending guide recess or guide slot 166 formed in end wall 8. Slot 166 can extend the entire height of end wall 8 or any portion thereof.

Referring to FIG. 31, air grid guide 168 includes an upper member 170 that rests on the top of end wall 8. The upper member may be detachably connected to end wall 8 by any suitable means. Guide 168 further includes a vertically extending support member 172 and guide loops 174 extending outwardly therefrom. The guide loops guide the installation of the substantially cylindrical drop pipe 176 and any other components of the air grid connected to drop pipe 176.

FIGS. 32 to 38

Figure 32:
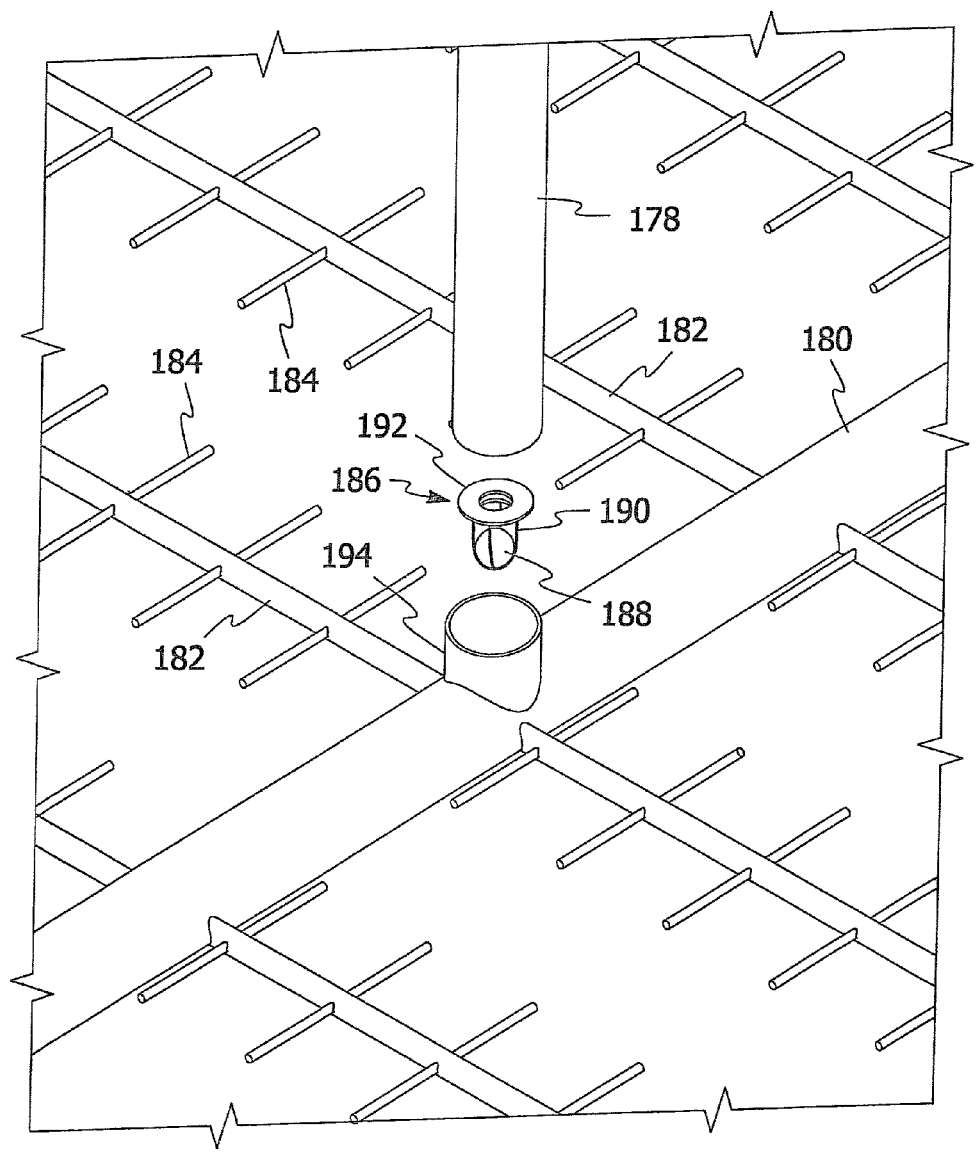
FIG. 32 is a fragmentary, exploded, perspective view of an air scour system having a preferred form of backflow preventer.
Figure 33:
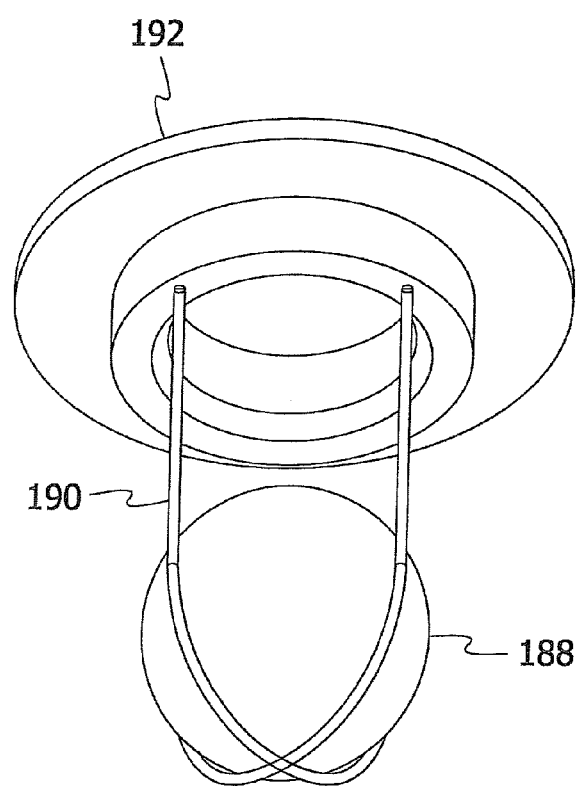
FIG. 33 is a perspective view of the preferred form of backflow preventer illustrated in FIG. 32.
Figure 34:
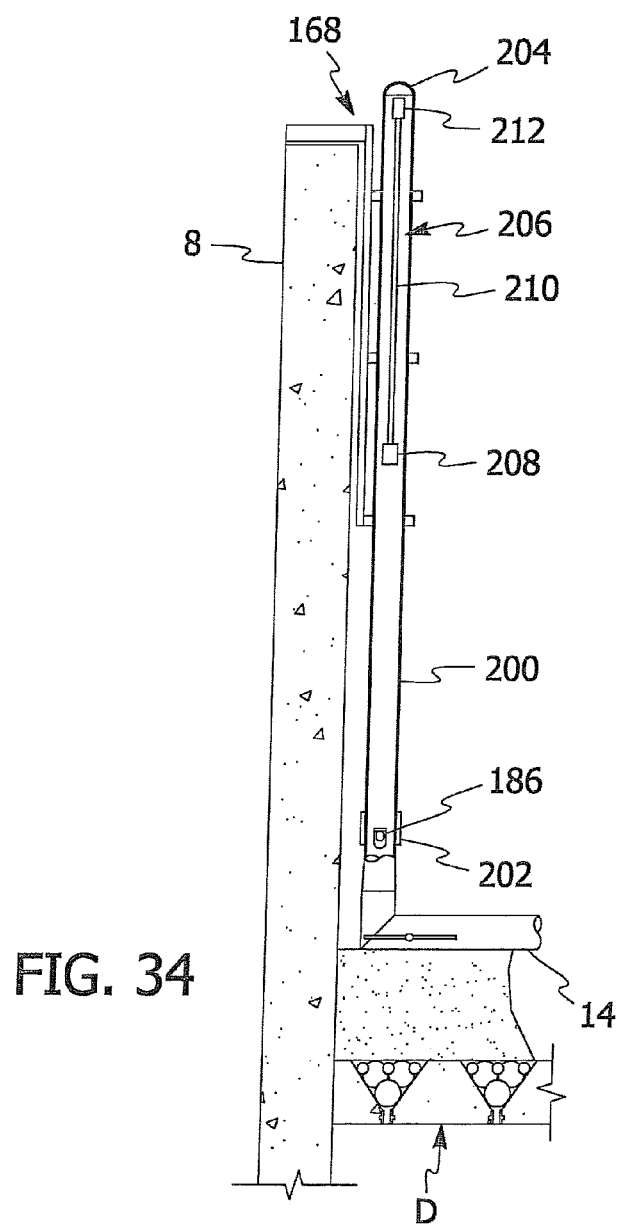
FIG. 34 is a fragmentary cross-sectional view of a filter illustrating yet a further alternative embodiment of the present invention.

Referring to FIGS. 32 to 34, the preferred forms of backflow prevention device will now be described. Referring to FIGS. 32 and 33, an air grid system J includes a drop pipe 178, air header 180, a plurality of laterals 182, a plurality of sub-laterals 184 and a backflow prevention valve 186. The air grid system J is inserted in a filter bed and is used to assist in cleaning of the filter bed by providing an air scour to agitate media in the filter bed to free impurities trapped during a filtration cycle.

Backflow prevention valve 186 includes a ball 188, a cage 190 and an annular collar 192. Annular collar 192 is substantially the same size as drop pipe 178 and annular collar 194 of header 180 to form a continuous conduit through which air can be directed to pass from a supply source (not shown) to air header 180. The joint formed between annular collar 192 and drop pipe 178 and the joint formed between annular collar 192 and collar 194 of header 180 may be sealed in any known manner.

During a cleaning operation of a filter bed, air from an air supply source passes into drop pipe 178 which in turn causes ball 188 to drop to the position show in FIG. 33. As a result, air is allowed to readily pass through cage 190 into air header 180. Subsequently, air passes through laterals 182 and sub-laterals 184 into the filter bed to agitate the media to assist in the removal of impurities trapped in the filter bed during a filtration cycle.

When the air scour cycle or cycles have been completed, the head of liquid in the filter compartment will act on ball 188 causing ball 188 to automatically travel upwardly and seat on the underside of annular collar 192. This prevents liquid in the filter compartment from passing through the sub-laterals, laterals and header upwardly into the drop pipe 178 when the air scour system is not being used. Hence, when it is desirable to air scour the filter bed, liquid does not have to first be forced out of the drop pipe prior to commencement of the air scour cycle. This arrangement is also desirable as it allows the drop pipe to be charged with air provided that the pressure of the air is not sufficient to overcome the force generated by the head of the liquid in the filter compartment.

Referring to FIG. 34, this embodiment is similar to the embodiment in 31. A backflow prevention valve 186 is used to prevent liquid in the filter compartment from occupying drop pipe 200. A sealing collar 202 is used to seal the connection of valve 186 to the adjoining portions of the air grid. Drop pipe 200 preferably includes a transparent dome 204 and a liquid indicator 206. Indicator 206 includes a float 208, a stem 210 and an indicator flag 212.

Should liquid enter the drop pipe 200 through a crack or other defect, float 208 will rise and indicator flag 212 will be readily visible to an operator through transparent dome 204. It should be noted that the present invention is not limited to the aforementioned indicator but rather would encompass any device capable of indicating to an operator that liquid is present in the drop pipe.

FIGS. 35 Through 43

Figure 37:
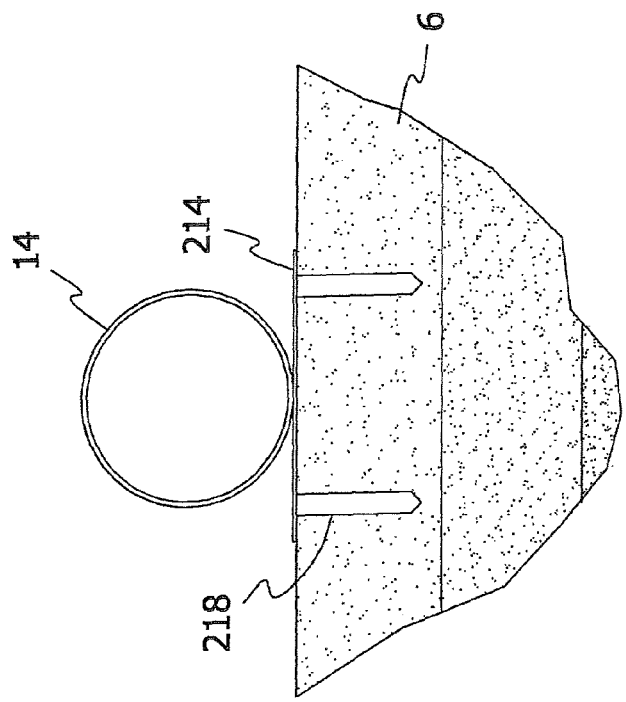
FIG. 37 is a fragmentary plan view of a further alternative embodiment of the fluid distribution system.
Figure 36:
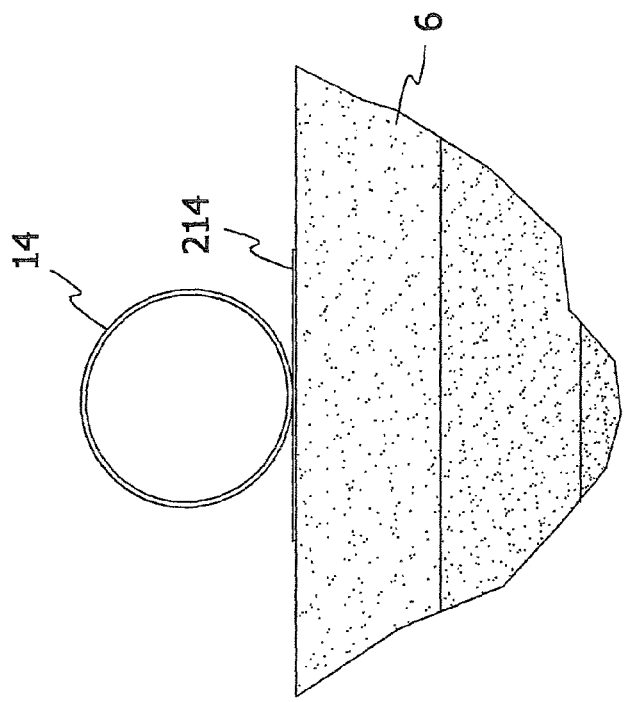
FIG. 36 is a fragmentary cross-sectional view of the embodiment illustrated in FIG. 35 in an operating position.
Figure 38:
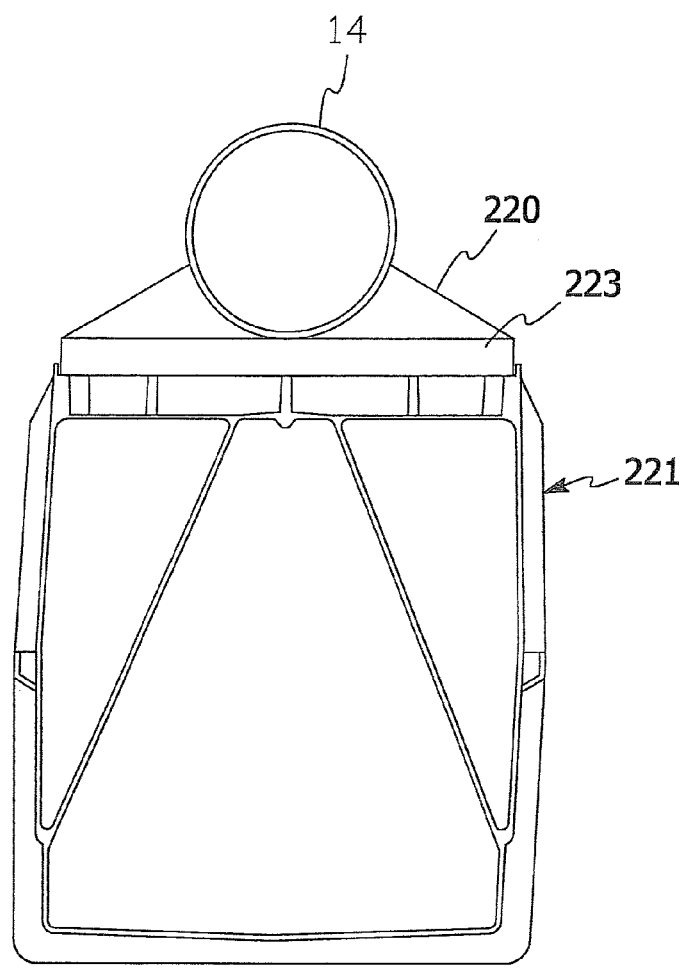
FIG. 38 is a cross-sectional view of a further alternative embodiment of the fluid distribution system of the present invention.

Referring to FIGS. 35 to 37, one or more stabilizers 214 may be operably connected to each air header 14 of an air grid system to further avoid the air grid system or components thereof from being improperly installed. Stabilizers 214 each have a plurality of openings 216 for permitting a fluid to pass therethrough. The number and size of the openings may be varied as desired. As shown in FIG. 37, stabilizers 214 may include a plurality of pins 218 that extend in the gravel to ensure that the air grid system maintains a desired orientation in the filter bed. As seen in FIG. 38, stabilizers 220 can be formed integral with an underdrain lateral 221 such as that of the type sold by Roberts Filter Group under the trademark TRILATERAL. Stabilizer 220 includes a recess for receiving the lower portion of header 14 to prevent misalignment of air header 14. For example, the stabilizer may be formed as one piece with the porous plate 223 of the underdrain lateral or may be a separate piece secured to the underdrain lateral.

Referring to FIGS. 39 to 41, a filter system K similar to those previously disclosed will now be discussed. The air scour system for filter K includes at least one drop pipe 222, at least one air header 224, a plurality of laterals 226 and sub-laterals 228. A vibrator 230 of the type disclosed in U.S. patent application Ser. No. 12/926,968 is attached to the air grid to impart a force on the filter bed C to permit the air grid to be inserted into filter bed C without removing media. Drop pipe 222 is guided into an operating position by a drop pipe adapter 232 of the type disclosed in U.S. patent application Ser. No. 12/926,968. The drop pipe adapter 232 forms a fluid chamber around two spaced openings in the drop pipe to supply air from a supply source to the drop pipe as described in U.S. patent application Ser. No. 12/926,968. The drop pipe adapter 232 includes an air supply pipe connection 234. As show in FIG. 40, the position of air supply connection pipe 234 may be readily varied by merely rotating the adapter 232. An adjustable anchor 236 detachably connects the drop pipe adapter to end wall 8 of the filter compartment B. Anchor 236 includes elongated slots 240 and 242 that permit adjustment of the vertical position of the anchor and the adapter 232 connected to the anchor. In this embodiment, a guide pole 244 detachably connected to air header 14 is used to guide the portion of the air grid adjacent end wall 10. Guide pole 244 can be formed as previously described. A guide member 246 similar to guide member 168 may be used to provide further assurance that the air grid will be properly installed in an optimal position in the filter bed. It should be noted that the only difference between guide member 246 and guide member 168 is that loops 248 are smaller than the loops of guide member 168.

Referring to FIGS. 42 and 43, this embodiment is very similar to that disclosed in FIGS. 39 to 41. The only difference is that cylindrical guide 250 is not connected to the air supply source. Rather, the air supply source connection 252 is connected to the drop pipe 254 above the hollow, cylindrical guide 250.

FIGS. 44 Through 52

Figure 45:
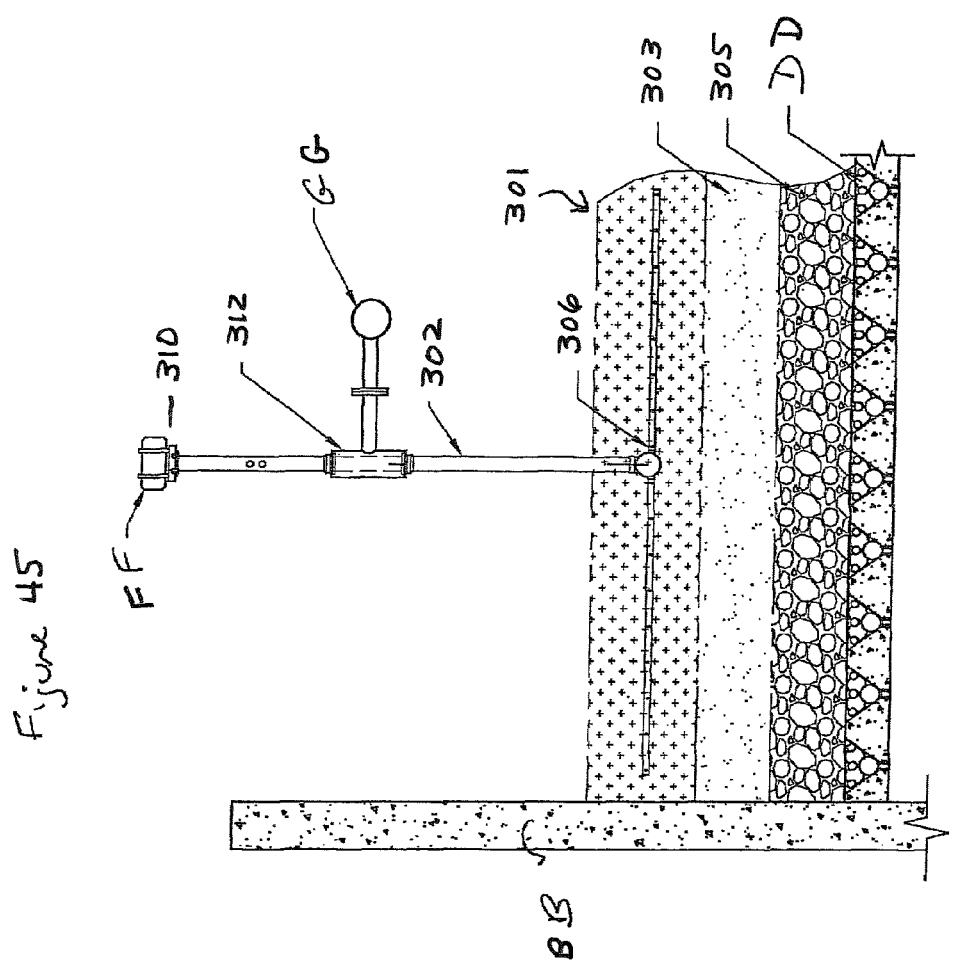
FIG. 45 is a fragmentary cross-sectional view of the embodiment of the present invention illustrated in FIG. 44 depicting an air grid being inserted into a filter bed.
Figure 46:
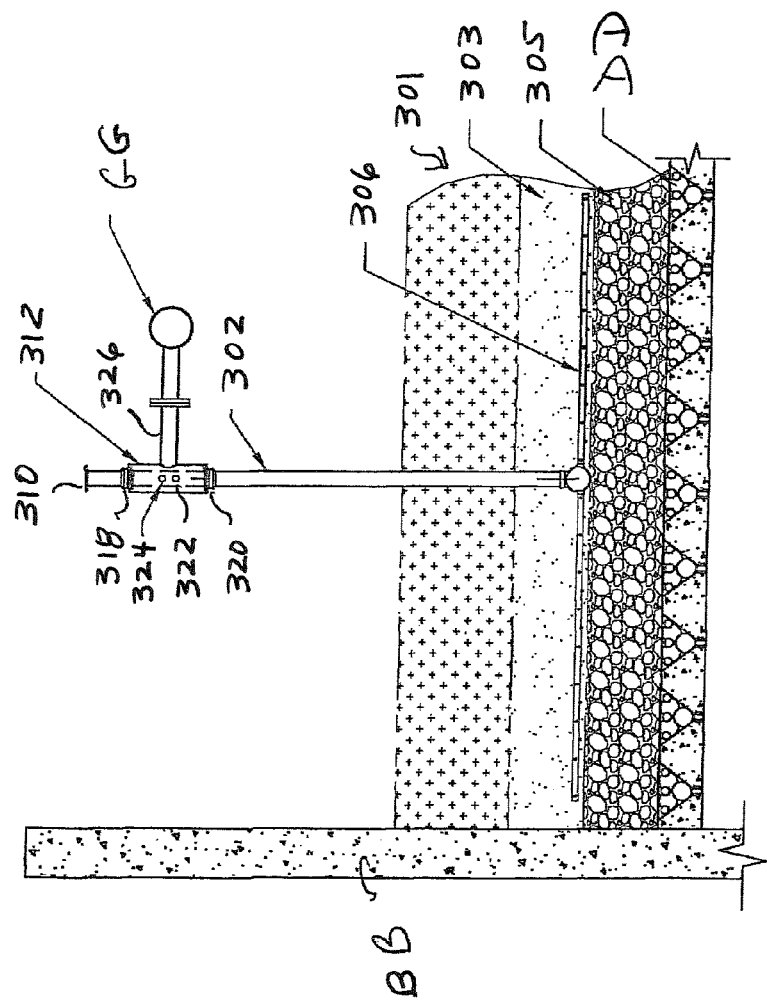
FIG. 46 is a fragmentary cross-sectional view of the embodiment of the present invention illustrated in FIG. 44 depicting an air grid subsequent to installation into a filter bed.

Referring to FIGS. 44 to 52, a filter system AA employing a preferred form of the invention is illustrated in one of many possible configurations. Filter AA includes a tank BB, a filter bed CC, an underdrain DD, an air grid system EE, a vibrator FF and an air supply source GG. While filter AA as shown in FIGS. 44 to 46 is a downflow filter (i.e., influent is passed downwardly through the filter bed CC during filtration), any filter can be used including but not limited to an upflow filter, an upflow clarifier and a bi-flow filter. As used herein, the term filter refers to any device that removes at least some impurities (e.g. foreign matter of any nature including a solid, a liquid or a gas) from water or wastewater. Tank BB can be formed from concrete, metal or other suitable material. Further, tank BB can be rectangular, circular or any other suitable shape.

Filter bed CC, as shown in FIGS. 44 to 46, includes a layer of anthracite 301 on top of a layer of sand 303 supported by a layer of gravel 305. It will be readily appreciated that any suitable filter bed may be used including a single layer filter bed. Further, while a gravel layer 305 is depicted as supporting the layers of filter media 301 and 303 above a conventional wheeler bottom type underdrain DD, the underdrain DD may be any conventional type including an underdrain formed from a plurality of laterals having a porous plate connected thereto obviating the need for a gravel layer. Further, while the filter element is depicted as a granular filter bed, vibrator FF can be used with any suitable filter element to enhance filtration or cleaning of the filter element. For example, the filter element can be settling plates, settling tubes or membranes.

The air gird system EE includes a substantially vertically extending drop pipe 302, a substantially horizontally extending air header 304 and a plurality of substantially horizontally extending laterals 306. The air grid system can include multiple grids in filter compartment 308. The air grid system EE can be of the type disclosed in U.S. Pat. Nos. 5,534,202 and 5,673,481. However, the present invention is not limited to the air grid disclosed in U.S. Pat. Nos. 5,534,202 and 5,673,481. Rather, any suitable air grid may be used. Further, the air grid may be omitted. For example, vibrator FF may be used to insert other components into a filter bed including but not limited to a monitor for monitoring at least one condition of the filter. The monitors disclosed in U.S. Pat. Nos. 5,980,755 and 6,159,384 are one type of monitor that can be inserted into filter bed CC using vibrator FF.

In the preferred form of the present invention, the vibrator FF is removably connected to a plate 310 disposed at an upper portion of drop pipe 302 to impart a vibrational force through the drop pipe 302, header 304 and the plurality of laterals 306. Plate 310 is connected to the upper end of drop pipe 302 to create a sealed upper end. A vibrational force will be imparted to the filter bed CC as the laterals 306, header 304 and drop pipe 302 come into contact with filter bed CC. Preferably, the vibrator FF has a frequency of between 30 to 60 HZ and exerts between 400 lbs to 1,000 lbs of force to allow the air grid system EE to be inserted into filter bed CC as depicted in FIG. 44. One suitable vibrator is the Martin Vibration Systems Model CDH 2.5 vibrator. However, the present invention is not limited to such a vibrator. Rather, any suitable vibrator may be used.

Most preferably, the frequency of vibrator FF matches the resonant frequency of the air grid system EE. It should be noted that the resonant frequency of the air grid system EE will vary with the configuration of the air grid, the media profile, water depth in the filter compartment 302 and other well-known factors.

While the air grid system EE is depicted in FIG. 44 as being installed directly above gravel layer 306, the final position of air grid system EE in the granular media may be varied as desired.

In the most preferred form of the present invention, the air grid system EE is at least partially inserted into the filter bed C by imparting a vibrational force to filter bed CC without passing any fluid through the filter bed CC and without removing media from filter bed CC. This is desirable especially in those instances for example during initial installation of a filter system where a fluid source may not be available. In another preferred form of the present invention, the air grid system EE or other component is at least partially inserted in filter bed CC by imparting a vibrational force to filter bed CC while simultaneously directing a fluid through the filter bed where the velocity of the fluid is sub-fluidization, i.e., where at least a portion of the bed does not expand more than 20 percent. This is desirable as the vibrational force necessary to insert the component in the filter bed CC can be significantly reduced. Further, the sub-fluidization velocity feature may allow for considerable savings in equipment costs including costs of pumps and related components. Moreover, the application of a vibrational force in combination with the sub-fluidization velocity to the filter bed CC allows for insertion of a component in a filter bed CC without removing filter media in those instances where it is impractical or impossible to fluidize the filter bed. It should be noted that the fluid used with the vibrational force may be a liquid or a gas or a combination thereof. Further, the fluid may be influent, filtered water or air. Preferably, the fluid is passed upwardly through filter bed CC when inserting air grid system EE or other component into filter bed CC.

While vibrator FF is located on the top of drop pipe 302, the vibrator may be located in any suitable position including attached to or mounted on a wall of the filter compartment 308, mounted on or attached to header 304 and mounted on or attached to one or more of laterals 306. Alternatively, vibrator FF could be mounted on another element in contact with filter bed CC.

Air grid system EE may be removed from filter bed CC for servicing or replacement by following the same procedure for inserting air gird system EE into filter bed CC.

Preferably, even after air grid system EE is inserted into filter bed CC, vibrator FF is also operated during at least a portion of the filtration cycle to enhance particle to particle contact resulting in the agglomeration of impurities such that the impurities are easily trapped in the filter bed or other filter element. Specifically, the vibrational force will be transmitted to the influent passing through the filter compartment 308 enhancing particle to particle collision resulting in agglomeration of impurities. When vibrator FF is not in use, it can be readily removed from drop pipe 302 and filter compartment 308.

Preferably, even after air grid system EE is inserted into filter bed CC, vibrator FF is also operated during at least a portion of a cleaning cycle of filter bed CC or other filter element to enhance agitation to aid in dislodging the impurities from filter bed CC or other filter element. For example, vibrator FF may be used while a liquid and/or air are passed upwardly through filter bed CC. Further, operation of the vibrator FF to impart a vibrational force to filter bed CC could be a separate cleaning step before or after passing a fluid through filter bed CC.

In the most preferred form of the present invention, drop pipe 302 is provided with an adapter 312 for permitting vertical and rotational adjustment of drop pipe 302. Adapter 312 is particularly advantageous as it allows one to readily compensate for a drop pipe or other component that is inadvertently sized incorrectly (e.g., too short or too long) without any field alteration to the size of the drop pipe 302. It should be noted that adapter 312 is optional. Further, the adapter can be used in any suitable fluid distribution system regardless of the manner in which the fluid distribution system is installed.

Figure 47:
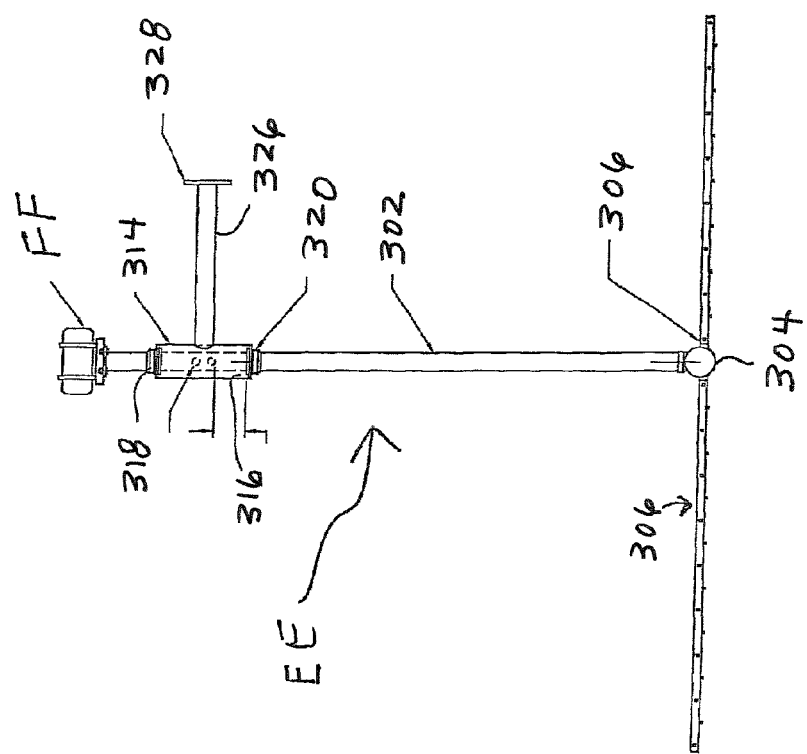
FIG. 47 is an elevational view of an air grid of the embodiment illustrated in FIG. 44 with an optional vibrator removably attached thereto.
Figure 50:
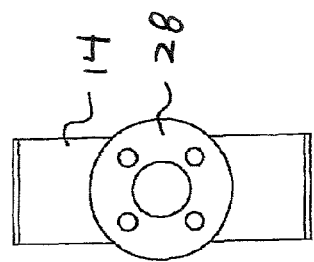
FIG. 50 is a right end view of an adapter formed in accordance with a preferred embodiment of the present invention.
Figure 48:
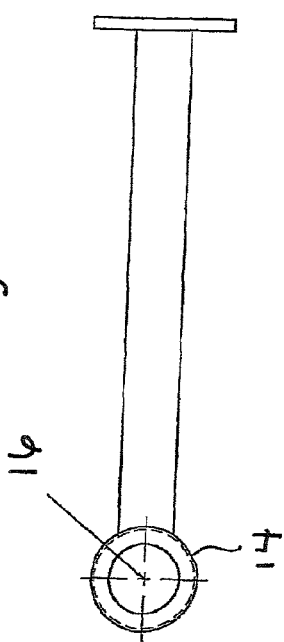
FIG. 48 is a plan view of an adapter formed in accordance with a preferred embodiment of the present invention.
Figure 49:
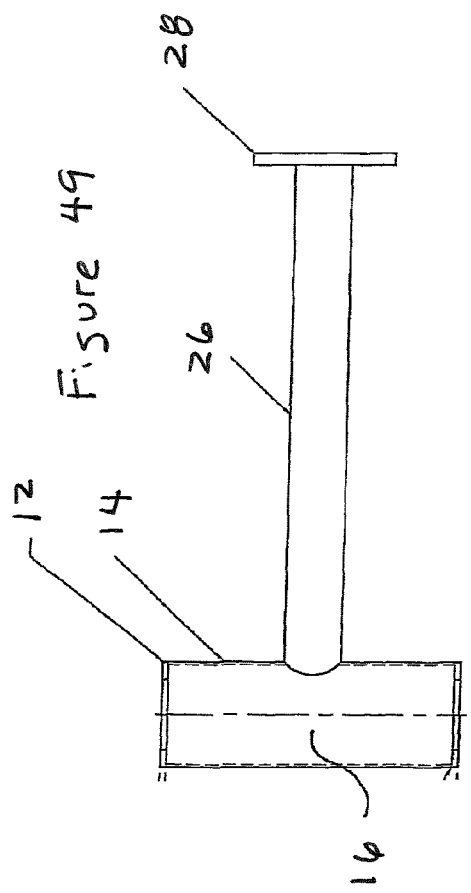
FIG. 49 is an elevation view of an adapter formed in accordance with a preferred embodiment of the present invention.

Referring to FIGS. 48 to 52, adapter 312 includes a hollow tubular member 314 having a hollow cavity 316 extending therethrough to receive drop pipe 302. Referring to FIG. 47, adapter 312 includes an upper seal 318 and a lower seal 320 to form an air chamber surrounding drop pipe 302. Preferably, as seen in FIG. 51, drop pipe 302 includes orifices 322 and 324 to permit air in the surrounding air chamber to pass through drop pipe 302, header 304 and laterals 306 into filter bed CC. Adapter 312 further includes a conduit 326 in communication with cavity 316 at one end and air supply source GG at the other end to convey air from the supply source GG to cavity 316. A plate 328 is preferably formed at one end of conduit 326 to facilitate connection with a mating element of air supply source GG.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A method for washing a filter for filtering water or wastewater, said method including the steps of:
   (a) providing a filter having a filter bed in which at least some impurities are removed from influent;
   (b) positioning an air grid in said filter bed, said air grid including a drop pipe, at least one header and at least one lateral;
   (c) providing an adapter for permitting vertical adjustment of said drop pipe, said adapter forming an air chamber along a portion of said drop pipe between a first end of said drop pipe and a second end of said drop pipe, said drop pipe having at least one orifice in communication with said air chamber such that air from said air chamber passes into said drop pipe and travels downwardly through said drop pipe during washing of said filter bed; and,
   (d) directing air through said air grid into said filter bed to remove impurities trapped in said filter bed during a filtration cycle.

2. The method of claim 1, wherein:
   (a) directing air step (d) in claim 1 includes directing air into said drop pipe from the air chamber of said adapter.

3. The method of claim 2, wherein:
   (a) directing air step (d) in claim 1 further includes directing air downwardly through said drop pipe into and through said at least one lateral and out the at least one lateral into the filter bed.

4. The method of claim 1, wherein:
   (a) during the directing air step (d) in claim 1, said adapter does not move in a vertical direction relative to said drop pipe.

5. The method of claim 1, further including the step of:
   (a) prior to step (d) in claim 1, moving said drop pipe in a vertical direction relative to said adapter.

6. The method of claim 1, wherein:
   (a) said filter bed includes at least one layer of gravel and at least one layer of filter media, the at least one lateral is disposed above said at least one layer of gravel and in said at least one layer of filter media.

7. A method for washing a filter for filtering water or wastewater, said method including the steps of:
   (a) providing a filter having a filter bed in which at least some impurities are removed from influent;
   (b) positioning an air grid in said filter bed, said air grid including a drop pipe, at least one header and at least one lateral, said drop pipe having a sealed upper end and an open lower end;
   (c) providing an adapter for permitting vertical adjustment of said drop pipe, said adapter forming an air chamber along a portion of said drop pipe between a first end of said drop pipe and a second end of said drop pipe, said drop pipe having at least one orifice in communication with said air chamber such that air from said air chamber passes into said drop pipe and travels downwardly through said drop pipe during washing of said filter bed; and,
   (d) directing air through said air grid into said filter bed to remove impurities trapped in said filter bed during a filtration cycle.

8. The method of claim 7, wherein:
   (a) directing air step (d) in claim 7 includes directing air into said drop pipe from the air chamber of said adapter.

9. The method of claim 8, wherein:
   (a) directing air step (d) in claim 7 further includes directing air downwardly through said drop pipe into and through said at least one lateral and out the at least one lateral into the filter bed.

10. The method of claim 7, wherein:
    (a) during the directing air step (d) in claim 7, said adapter does not move in a vertical direction relative to said drop pipe.

11. The method of claim 7, further including the step of:
    (a) prior to step (d) in claim 7, moving said drop pipe in a vertical direction relative to said adapter.

12. The method of claim 7, wherein:
    (a) said filter bed includes at least one layer of gravel and at least one layer of filter media, the at least one lateral is disposed above said at least one layer of gravel and in said at least one layer of filter media.

\* \* \* \* \*